(12) United States Patent
Inoue et al.

(10) Patent No.: US 7,113,547 B2
(45) Date of Patent: Sep. 26, 2006

(54) DATA COMMUNICATION SYSTEM, CONTROLLER DEVICE AND DATA COMMUNICATION METHOD

(75) Inventors: Atsuo Inoue, Kyoto (JP); Shota Nakashima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 840 days.

(21) Appl. No.: 10/223,346

(22) Filed: Aug. 20, 2002

(65) Prior Publication Data

US 2003/0039313 A1 Feb. 27, 2003

(30) Foreign Application Priority Data

Aug. 24, 2001 (JP) ............................. 2001-254266
Nov. 30, 2001 (JP) ............................. 2001-366480

(51) Int. Cl.
*H04L 27/00* (2006.01)
(52) U.S. Cl. ..................................................... 375/256
(58) Field of Classification Search ........ 375/256–258, 375/295, 316, 377; 327/108, 141
See application file for complete search history.

(56) References Cited

U.S. PATENT DOCUMENTS

| | | | |
|---|---|---|---|
| 5,473,635 A | 12/1995 | Chevroulet | |
| 6,145,749 A | 11/2000 | Thuringer et al. | |
| 6,304,613 B1 | 10/2001 | Koller et al. | |
| 6,323,728 B1 * | 11/2001 | Schmitt-Landsiedel et al. | 329/347 |
| 6,474,558 B1 * | 11/2002 | Reiner | 235/492 |
| 6,581,844 B1 * | 6/2003 | Thueringer et al. | 235/492 |
| 6,996,726 B1 * | 2/2006 | Den Besten et al. | 713/300 |
| 2002/0020903 A1 * | 2/2002 | Kreft et al. | 257/679 |

* cited by examiner

*Primary Examiner*—Khanh Tran
(74) *Attorney, Agent, or Firm*—McDermott Will & Emery LLP

(57) ABSTRACT

In a controller device, when a first transmitting signal is at a "L" level, a first operation voltage is high and the amplitude of signals CK and ICK is large, and on the contrary, the amplitude is small when the first transmitting signal is at a "H" level. In a data carrier device, the signals CK and ICK are subjected to full-wave rectification by a rectifier circuit so as to generate a second operation voltage, and a first receiving signal is extracted from the second operation voltage by a first signal detection circuit. On the other hand, in the data carrier device, when a second transmitting signal is at a "L" level, impedance between two contacts is small and the amplitude of the signals CK and ICK is small, and on the contrary, the amplitude is large when the second transmitting signal is at a "H" level. In the controller device, change of the amplitude of the signal ICK is extracted as a second receiving signal by a second signal detection circuit. Accordingly, supply of power and clock and two-way serial data communication can be simultaneously executed between the controller device and the data carrier device through merely two contacts.

34 Claims, 19 Drawing Sheets

FIG. 14A TS1

FIG. 14B ICK

FIG. 14C CK

FIG. 14D Vin

FIG. 14E RS2

FIG. 17A CK1 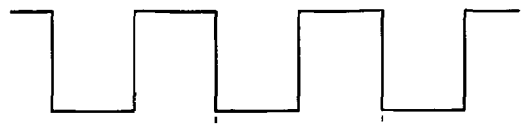
FIG. 17B TS1  "H"  "L"  "H"
FIG. 17C Vout  "H"  "L"  "H"
FIG. 17D ICK 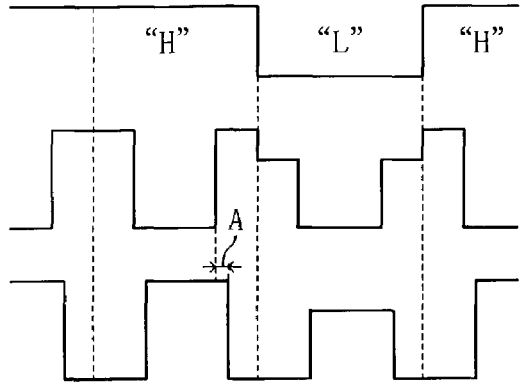
FIG. 17E CK
FIG. 17F Vin
FIG. 17G PRESELECTED VOLTAGE AND OUTPUT OF HIGH-PASS FILTER 222 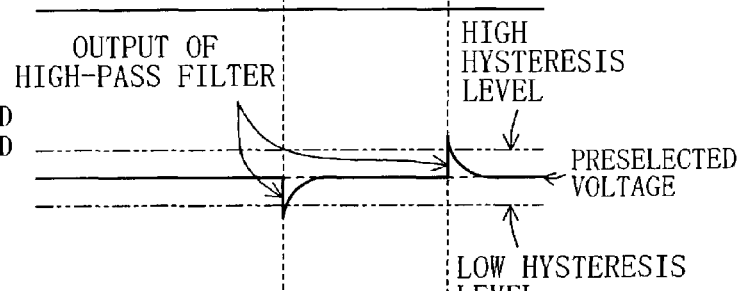
OUTPUT OF HIGH-PASS FILTER
HIGH HYSTERESIS LEVEL
PRESELECTED VOLTAGE
LOW HYSTERESIS LEVEL
FIG. 17H OUTPUT OF COMPARATOR 223  "H"  "L"  "H"
FIG. 17I CK2 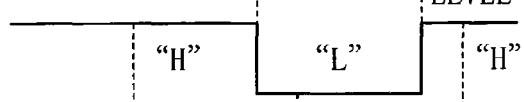
FIG. 17J RS2  "H"  "L"  "H"

FIG. 18C Vout "H" "L" "H"

FIG. 18D ICK

FIG. 18E CK

FIG. 18F Vin

FIG. 18G PRESELECTED VOLTAGE AND OUTPUT OF HIGH-PASS FILTER 222

OUTPUT OF HIGH-PASS FILTER
HIGH HYSTERESIS LEVEL
PRESELECTED VOLTAGE
LOW HYSTERESIS LEVEL

FIG. 18H OUTPUT OF COMPARATOR 223 "H" "L" "H"

FIG. 20A CK1 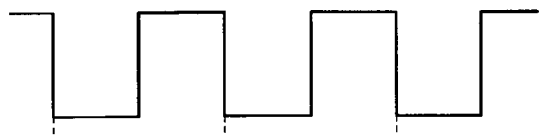
FIG. 20B TS1 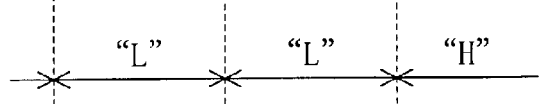
FIG. 20C Vout 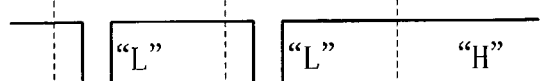
FIG. 20D ICK
FIG. 20E CK 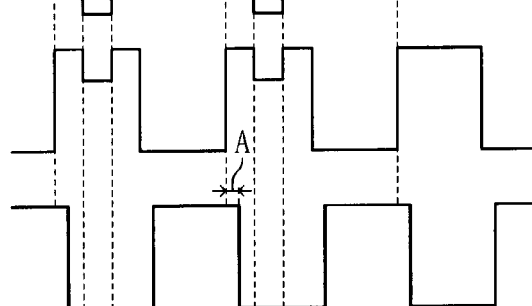
FIG. 20F Vin 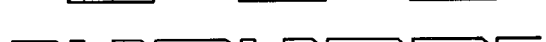
FIG. 20G PRESELECTED VOLTAGE AND OUTPUT OF HIGH-PASS FILTER 222 
FIG. 20H OUTPUT OF COMPARATOR 223 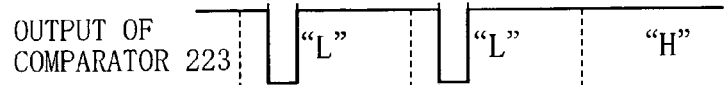
FIG. 20I CK2 
FIG. 20J OUTPUT OF D-TYPE FLIP-FLOP 225 WITH ASYNCHRONOUS RESET 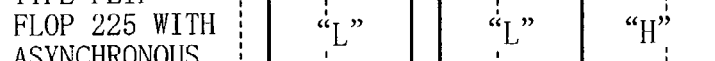
FIG. 20K RS2 

DATA COMMUNICATION SYSTEM, CONTROLLER DEVICE AND DATA COMMUNICATION METHOD

BACKGROUND OF THE INVENTION

The present invention relates to a data communication system. More particularly, it relates to data transfer technology suitably used in a connect-type data carrier system in which a controller device and a data carrier device are connected to each other through two lines.

FIG. 1 is a diagram for roughly showing a conventional data communication system. As shown in FIG. 1, in the conventional data communication system, a data carrier device 52 and a controller device 51 are connected to each other for data communication through four contacts respectively used for power supply, grounding, a clock and a data signal.

Since the conventional data communication system thus needs four contacts for the data communication, it is difficult to downsize the whole system.

SUMMARY OF THE INVENTION

An object of the invention is providing a data communication system in which data communication can be performed between a controller device and a data carrier device through merely two contacts.

Specifically, the data communication system of this invention includes a controller device and a data carrier device connectable to said controller device through first and second contacts for performing data transfer between said controller device and said data carrier device, and the controller device includes a power supply line for supplying power; a clock generation circuit for generating a clock pulse signal and supplying the clock pulse signal to at least one of the first and second contacts; a voltage level generation circuit for converting a voltage from the power supply line and supplying the converted voltage to the clock generation circuit as a first operation voltage; and a first transmitter circuit for changing the first operation voltage generated by the voltage level generation circuit in accordance with a first transmitting signal, and the data carrier device includes a rectifier circuit for rectifying a voltage between the first and second contacts and supplying the rectified voltage to the data carrier device as a second operation voltage; a first signal detection circuit for detecting, as a first receiving signal, change of the second operation voltage having been rectified by the rectifier circuit; and a clock detection circuit for generating an operation clock on the basis of the clock pulse signal supplied to at least one of the first and second contacts.

In this data communication system, the clock pulse signal is supplied to at least one of the first and second contacts from the clock generation circuit included in the controller device, and the voltage between the first and second contacts is rectified by the rectifier circuit in the data carrier device so as to generate the second operation voltage. Also, the operation clock is generated by the clock detection circuit on the basis of the supplied clock pulse signal. Furthermore, the first operation voltage for the clock generation circuit is changed in accordance with the first transmitting signal, so as to change the amplitude of the clock pulse signal supplied from the controller device. In the data carrier device, the change of the rectified second operation voltage derived from the amplitude change of the clock pulse signal is detected as the first receiving signal. In this manner, supply of the power and the clock from the controller device to the data carrier device and serial data communication can be both executed through the first and second contacts alone.

In a preferred aspect of the data communication system, the voltage level generation circuit includes a plurality of resistors serially disposed between the power supply line and ground, and supplies the first operation voltage from an end of one of the plurality of resistors, and the first transmitter circuit includes a switching element that is connected in parallel to at least one of the plurality of resistors and is turned on/off in accordance with the first transmitting signal.

In another preferred aspect of the data communication system, the voltage level generation circuit includes a plurality of resistors serially disposed between the power supply line and ground, and supplies the first operation voltage from an end of one of the plurality of resistors, and the first transmitter circuit includes a switching element that is connected in series to at least one of the plurality of resistors and is turned on/off in accordance with the first transmitting signal.

Alternatively, the data communication system of this invention includes a controller device and a data carrier device connectable to said controller device through first and second contacts for performing data transfer between said controller device and said data carrier device, and the controller device includes a power supply line for supplying power; a voltage level generation circuit for converting a voltage from the power supply line and supplying the converted voltage as a signal voltage between the first and second contacts; and a first transmitter circuit for changing the signal voltage generated by the voltage level generation circuit in accordance with a first transmitting signal, and the data carrier device includes a regulator for stabilizing a voltage between the first and second contacts and supplying the stabilized voltage as an operation voltage of the data carrier device; and a first signal detection circuit for detecting, as a first receiving signal, change of the voltage between the first and second contacts.

In this data communication system, the signal voltage is supplied as the voltage between the first and second contacts from the voltage level generation circuit included in the controller device, and the voltage between the first and second contacts is stabilized in the data carrier device to generate the operation voltage of the data carrier device. Also, the signal voltage supplied from the controller device is changed in accordance with the first transmitting signal. In the data carrier device, the change of the signal voltage is detected as the first receiving signal. In this manner, the supply of the power from the controller device to the data carrier device and the serial data communication can be both executed through the first and second contacts alone.

In a preferred aspect of the data communication system, the controller device further includes a second signal detection circuit for detecting, as a second receiving signal, change of the voltage between the first and second contacts, and the data carrier device further includes a second transmitter circuit for changing impedance between the first and second contacts in accordance with a second transmitting signal. Thus, the data carrier device changes the impedance between the first and second contacts in accordance with the second transmitting signal. Also, the controller device detects, as the second transmitting signal, the voltage change between the first and second contacts derived from the impedance change. Thus, two-way serial data communication between the controller device and the data carrier device can be executed through the first and second contacts alone.

In another preferred aspect of the data communication system, the voltage level generation circuit includes a plurality of resistors serially disposed between the power supply line and ground, and supplies the signal voltage from an end of one of the plurality of resistors, and the first transmitter circuit includes a switching element that is connected in parallel to at least one of the plurality of resistors and is turned on/off in accordance with the first transmitting signal.

Alternatively, the data communication system of this invention includes a controller device and a data carrier device connectable to said controller device through first and second contacts for performing data transfer between said controller device and said data carrier device, and the controller device includes a power supply line for supplying power; a clock generation circuit for generating a clock pulse signal and supplying the clock pulse signal to at least one of the first and second contacts; a voltage level generation circuit for converting a voltage from the power supply line and supplying, as a first operation voltage, the converted voltage to the clock generation circuit; and a pulse width modulation circuit for changing, in accordance with a first transmitting signal, a pulse width of the clock pulse signal generated by the clock generation circuit, and the data carrier device includes a rectifier circuit for rectifying a voltage between the first and second contacts and supplying the rectified voltage to the data carrier device as a second operation voltage; a first signal detection circuit for detecting, as a first receiving signal, change of the pulse width of the clock pulse signal on either of the first and second contacts; and a clock detection circuit for generating an operation clock on the basis of the clock pulse signal supplied to at least one of the first and second contacts.

In this data communication system, the clock pulse signal is supplied to at least one of the first and second contacts from the clock generation circuit included in the controller device, and the voltage between the first and second contacts is rectified by the rectifier circuit in the data carrier device so as to generate the second operation voltage. Also, the pulse width of the clock pulse signal supplied from the controller device is changed in accordance with the first transmitting signal. In the data carrier device, the change of the pulse width of the clock pulse signal is detected as the first receiving signal. In this manner, the supply of the power from the controller device to the data carrier device and the serial data communication can be both executed through the first and second contacts alone.

Alternatively, the data communication system of this invention includes a controller device and a data carrier device connectable to said controller device through first and second contacts for performing data transfer between said controller device and said data carrier device, and the controller device includes a power supply line for supplying power; a clock generation circuit for receiving a first operation voltage from the power supply line, generating a clock pulse signal and supplying the clock pulse signal to at least one of the first and second contacts; and a first transmitter circuit for changing, in accordance with a first transmitting signal, one of a higher voltage level and a lower voltage level of the clock pulse signal generated by the clock generation circuit, and the data carrier device includes a rectifier circuit for rectifying a voltage between the first and second contacts and supplying the rectified voltage to the data carrier device as a second operation voltage; a first signal detection circuit for detecting, as a first receiving signal, change of the second operation voltage having been rectified by the rectifier circuit; and a clock detection circuit for generating an operation clock on the basis of the clock pulse signal supplied to at least one of the first and second contacts.

In this data communication system, the clock pulse signal is supplied to at least one of the first and second contacts from the clock generation circuit included in the controller device, and the voltage between the first and second contacts is rectified by the rectifier circuit in the data carrier device so as to generate the second operation voltage. Also, the operation clock is generated by the clock detection circuit on the basis of the supplied clock pulse signal. Furthermore, one of the higher voltage level and the lower voltage level of the clock pulse signal supplied from the controller device is changed in accordance with the first transmitting signal. In the data carrier device, the change of the rectified second operation voltage derived from the change of one of the higher voltage level and the lower voltage level of the clock pulse signal is detected as the first receiving signal. In this manner, the supply of the power and the clock from the controller device to the data carrier device and the serial data communication can be both executed through the first and second contacts alone.

Preferably, the controller device further includes a second signal detection circuit for detecting, as a second receiving signal, change of voltage amplitude on one of the first and second contacts, and the data carrier device further includes a second transmitter circuit for changing impedance between the first and second contacts in accordance with a second transmitting signal. Thus, the data carrier device changes the impedance between the first and second contacts in accordance with the second transmitting signal. Also, the controller device detects, as the second transmitting signal, the change of the voltage amplitude on one of the first and second contacts derived from the impedance change. In this manner, the two-way serial data communication can be executed through the first and second contacts alone.

Preferably, the controller device further includes a second signal detection circuit for detecting, as a second receiving signal, change of voltage amplitude on a terminal for outputting the first operation voltage of the voltage level generation circuit, and the data carrier device further includes a second transmitter circuit for changing impedance between the first and second contacts in accordance with a second transmitting signal.

Preferably, the controller device supplies, to the first contact, the clock pulse signal generated by the clock generation circuit and supplies, to the second contact, an inverted clock pulse signal in a phase reverse to that of the clock pulse signal generated by the clock generation circuit, and the rectifier circuit performs full-wave rectification on the voltage between the first and second contacts.

Preferably, the controller device supplies the clock pulse signal generated by the clock generation circuit to the first contact and supplies ground potential to the second contact, and the rectifier circuit performs half-wave rectification on the voltage between the first and second contacts.

Preferably, the voltage level generation circuit and the clock generation circuit are serially connected to each other in the controller device.

Preferably, the clock generation circuit generates the clock pulse signal and an inverted clock pulse signal in a phase reverse to that of the clock pulse signal and supplies the clock pulse signal and the inverted clock pulse signal to the first and second contacts, respectively, and the first transmitter circuit changes the first operation voltage in accordance with the first transmitting signal in such a manner that a rise edge of the first operation voltage supplied to the clock generation circuit is generated in a stable period shifted from edges of the clock pulse signal and the inverted clock pulse signal. Thus, a period when skew is caused between the clock pulse signal and the inverted clock pulse signal can be prevented from overlapping generation timing of the rise edge of the first operation voltage supplied to the clock generation circuit. Therefore, it is possible to avoid change rounding of the second operation voltage, which is otherwise caused when a glitch of the second operation voltage caused in the data carrier device during the skew overlaps the rise of the voltage of the first transmitting signal. Accordingly, the change of the second operation voltage of the data carrier device can be acute, the change of the second operation voltage can be easily extracted as the first receiving signal, and data transferred from the controller device to the data carrier device can be accurately extracted.

Preferably, the first transmitter circuit changes the first operation voltage in accordance with the first transmitting signal in such a manner that voltage changes corresponding to a rise edge and a glitch edge of the first operation voltage appear in one of the clock pulse signal and the inverted clock pulse signal.

Preferably, the first transmitter circuit changes the first operation voltage in accordance with the first transmitting signal in such a manner that a voltage change corresponding to a rise edge of the first operation voltage appears in one of the clock pulse signal and the inverted clock pulse signal and that a voltage change corresponding to a glitch edge of the first operation voltage appears in the other of the clock pulse signal and the inverted clock pulse signal.

Preferably, the first transmitter circuit changes the first operation voltage in accordance with the first transmitting signal with causing a difference between a period when the first operation voltage has potential corresponding to a logical "H" level and a period when the first operation voltage has potential corresponding to a logical "L" level. When the period when the first operation voltage has potential corresponding to a logical level necessary to consume larger power is shorter, the power consumption of the voltage level generation circuit can be reduced. For example, if the voltage level generation circuit has a circuit configuration in which larger power is necessary for generating potential corresponding to a logical "H" level, the power consumption of the voltage level generation circuit can be reduced by setting the period of the potential corresponding to the "H" level to be shorter than that corresponding to the "L" level.

Preferably, the first signal detection circuit includes a high-pass filter for receiving a voltage in which a change is to be detected and detecting an edge of the voltage. In this case, in order to identify the logical level of the transmitting signal superimposed on the second operation voltage of the data carrier device or superimposed as a voltage difference on the voltage between the first and second contacts, the edge of the second operation voltage or the voltage between the first and second contacts can be detected. Thus, the data extraction can be eased.

Preferably, the first signal detection circuit includes a low-pass filter for removing noise from the voltage; a comparator for comparing a level of a signal having passed through the high-pass filter with a given level; and a flip-flop for receiving a comparison result of the comparator and detecting, as the first receiving signal, a signal in synchronization with the operation clock generated by the clock detection circuit, and the high-pass filter receives a signal having passed through the low-pass filter.

Alternatively, the controller device of this invention for performing data transfer to and from a data carrier device through first and second contacts, includes a power supply line for supplying power; a clock generation circuit for generating a clock pulse signal and an inverted clock pulse signal in a phase reverse to that of the clock pulse signal, and supplying the clock pulse signal and the inverted clock pulse signal to the first and second contacts, respectively; a voltage level generation circuit for converting a voltage from the power supply line and supplying, as an operation voltage, the converted voltage to the clock generation circuit; and a transmitter circuit for changing the operation voltage generated by the voltage level generation circuit in accordance with a transmitting signal, and the operation voltage is generated in such a manner that a rise edge of the operation voltage is generated in a stable period shifted from edges of the clock pulse signal and the inverted clock pulse signal.

Further alternatively, the data communication method of this invention for performing data transfer between a controller device and a data carrier device through first and second contacts, includes the steps of generating a clock pulse signal in the controller device; changing a voltage level of the clock pulse signal in accordance with a first transmitting signal and supplying the clock pulse signal to at least one of the first and second contacts in the controller device; rectifying a voltage between the first and second contacts and supplying the rectified voltage to the data carrier device as a second operation voltage in the data carrier device; detecting change of the second operation voltage as a first receiving signal in the data carrier device; generating an operation clock on the basis of the clock pulse signal supplied to at least one of the first and second contacts in the data carrier device; detecting, as a second receiving signal, change of voltage amplitude on one of the first and second contacts in the controller device; and changing impedance between the first and second contacts in accordance with a second transmitting signal in the data carrier device.

Alternatively, the data communication method of this invention for performing data transfer between a controller device and a data carrier device through first and second contacts, includes the steps of generating a first operation voltage by changing a voltage from a power supply line in accordance with a transmitting signal in the controller device; generating a clock pulse signal and an inverted clock pulse signal in a phase reverse to that of the clock pulse signal by using the first operation voltage as an operation voltage in the controller device; supplying the clock pulse signal and the inverted clock pulse signal to the first and second contacts, respectively in the controller device; generating a second operation voltage as an operation voltage of the data carrier device by rectifying a voltage between the first and second contacts in the data carrier device; and detecting change of the second operation voltage as a receiving signal in the data carrier device, and the first operation voltage is generated in such a manner that a rise edge of the first operation voltage is generated in a stable period shifted from edges of the clock pulse signal and the inverted clock pulse signal.

Preferably, the first operation voltage is generated by changing the first operation voltage in accordance with the transmitting signal in such a manner that a voltage change corresponding to a rise edge of the first operation voltage appears in one of the clock pulse signal and the inverted clock pulse signal and that a voltage change corresponding to a glitch edge of the first operation voltage appears in the other of the clock pulse signal and the inverted clock pulse signal.

BRIEF DESCRIPTION OF THE DRAWINGS

FIGS. 17A, 17B, 17C, 17D, 17E, 17F, 17G, 17H, 17I and 17J are timing charts for showing the operation of the data communication system of FIG. 15;

FIGS. 18A, 18B, 18C, 18D, 18E, 18F, 18G, 18H, 18I and 18J are other timing charts for showing the operation of the data communication system of FIG. 15;

FIGS. 20A, 20B, 20C, 20D, 20E, 20F, 20G, 20H, 20I, 20J and 20K are timing charts for showing the operation of the data communication system of Embodiment 7.

DETAILED DESCRIPTION OF THE INVENTION

Preferred embodiments of the invention will now be described with reference to the accompanying drawings.

Embodiment 1

Figure 1:
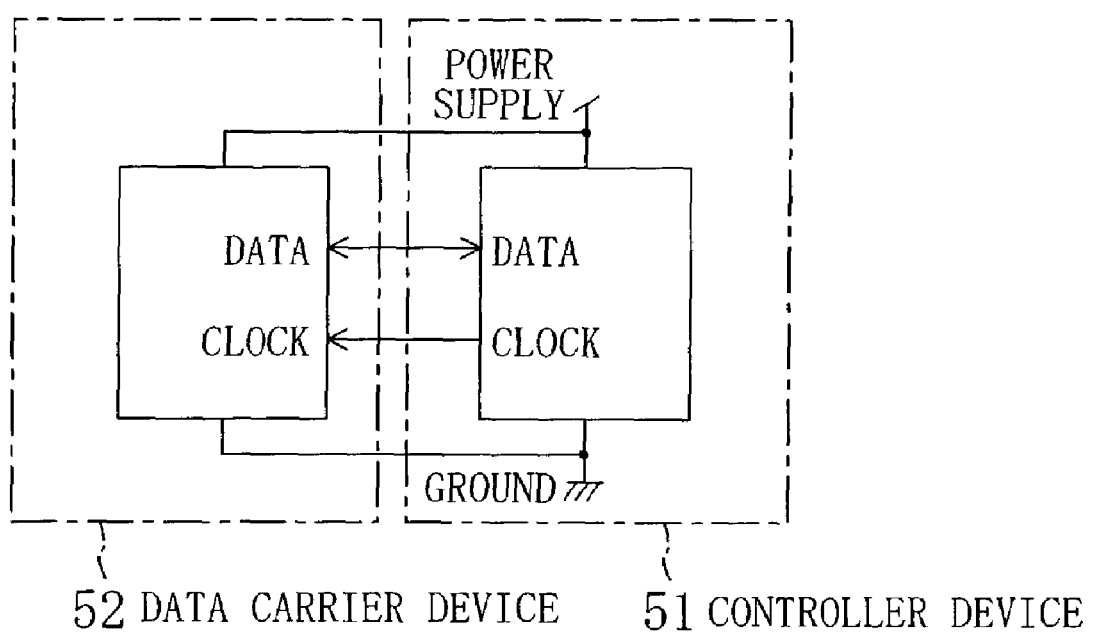
FIG. 1 is a diagram for roughly showing the structure of a conventional data communication system.
Figure 2:
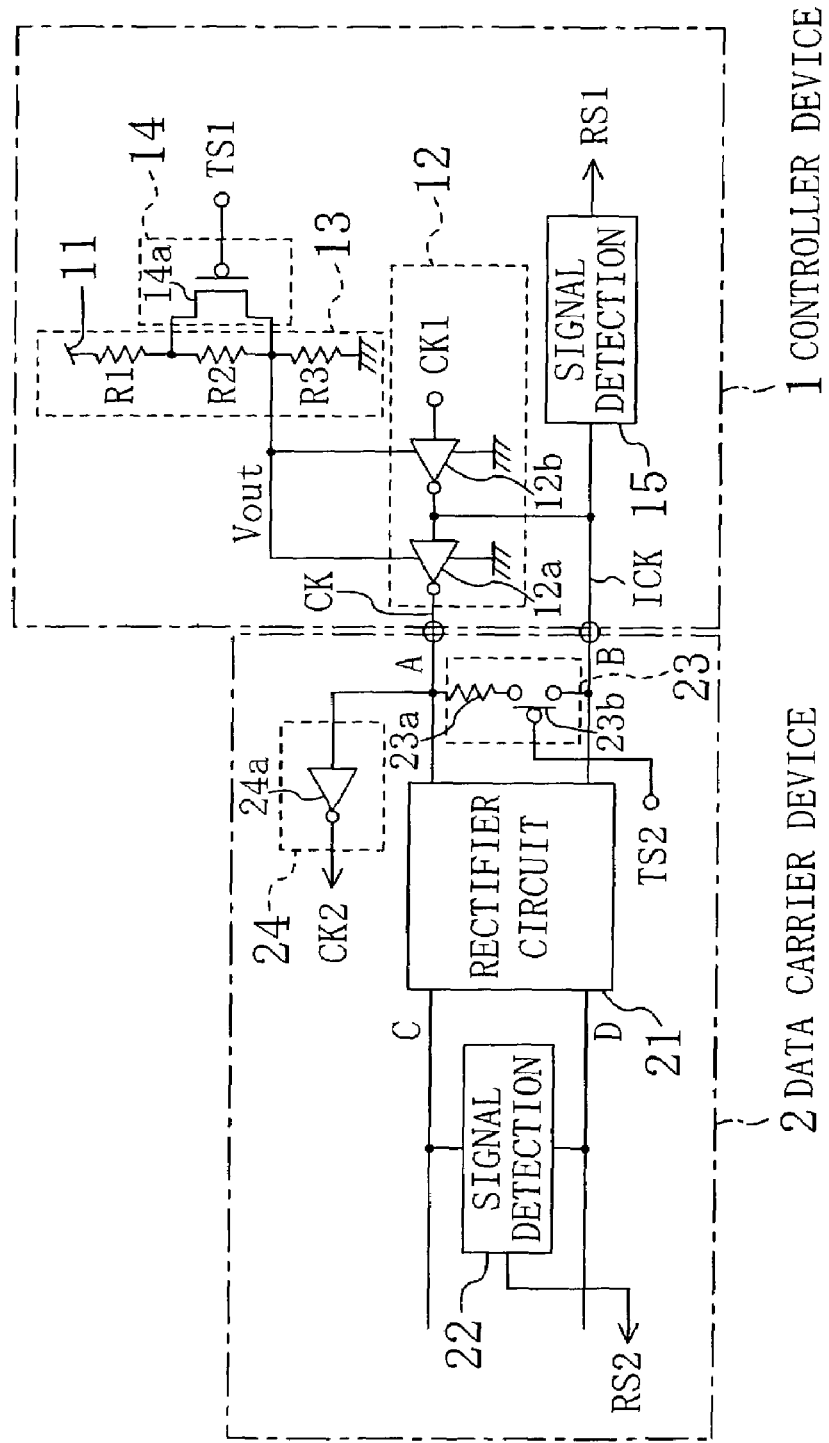
FIG. 2 is a diagram for showing the structure of a data communication system according to Embodiment 1 of the invention.

FIG. 2 shows the structure of a data communication system according to Embodiment 1 of the invention. In the data communication system shown in FIG. 2, a controller device 1 and a data carrier device 2 perform data communication therebetween through two contacts A and B.

The controller device 1 includes a power supply line 11 for supplying power; a clock generation circuit 12 for generating a clock pulse signal CK (hereinafter referred to as the signal CK) and an inverted clock pulse signal ICK (hereinafter referred to as the signal ICK) in a phase reverse to that of the signal CK and supplying these signals to the first and second contacts A and B, respectively; a voltage level generation circuit 13 for converting the voltage from the power supply line 11 and supplying the converted voltage to the clock generation circuit 12 as a first operation voltage Vout; a first transmitter circuit 14 for changing the first operation voltage Vout generated by the voltage level generation circuit 13 in accordance with a first transmitting signal TS1; and a second signal detection circuit 15 for detecting change of voltage amplitude on the second contact B as a second receiving signal RS1. The amplitude of the signals CK and ICK supplied from the clock generation circuit 12 depends upon the first operation voltage Vout generated by the voltage level generation circuit 13. Specifically, the amplitude of the signals CK and ICK is changed by the first transmitter circuit 14 in accordance with the first transmitting signal TS1.

The data carrier device 2 includes a rectifier circuit 21 for rectifying a voltage between the first and second contacts A and B; a first signal detection circuit 22 for detecting, as a first receiving signal RS2, the change of the amplitude of the signals CK and ICK supplied to the first and second contacts A and B; a second transmitter circuit 23 for changing impedance between the first and second contacts A and B in accordance with a second transmitting signal TS2; and a clock detection circuit 24 for generating an operation clock CK2 of the data carrier device 2 on the basis of a signal on the first contact A. The output of the rectifier circuit 21 is supplied to the data carrier device 2 as a second operation voltage. Also, the voltage change between the first and second contacts A and B derived from the impedance change caused by the second transmitter circuit 23 is supplied to the controller device 1 as a signal.

In the controller device 1, the voltage level generation circuit 13 includes a plurality of resistors R1, R2 and R3 for dividing the voltage from the power supply line 11, and outputs a voltage between the resistors R2 and R3 as the first operation voltage Vout. The first transmitter circuit 14 includes a MOS transistor 14a connected in parallel to the resistor R2 of the voltage level generation circuit 13. The gate of the MOS transistor 14a working as a switching element is supplied with the first transmitting signal TS1. The MOS transistor 14a is turned on/off in accordance with the voltage level of the first transmitting signal TS1. When the MOS transistor 14a is in an on state, the ends of the resistor R2 are short-circuited, and hence the first operation voltage Vout is relatively high. On the contrary, when the MOS transistor 14a is in an off state, the first operation voltage Vout is relatively low.

The clock generation circuit 12 includes two stages of inverters 12a and 12b serially connected to each other. The first inverter 12a outputs the signal CK in a phase the same as that of an operation clock CK1 supplied thereto. On the other hand, the second inverter 12b outputs the signal ICK in a phase reverse to that of the operation clock CK1. The first operation voltage Vout output from the voltage level generation circuit 13 is supplied to the power supply terminals of the inverters 12a and 12b, and the amplitude of the signals CK and ICK is changed in accordance with the first operation voltage Vout. The first signal detection circuit 15 is connected to the contact B so as to detect a signal superimposed on the signal ICK sent from the data carrier device 2.

In the data carrier device 2, the rectifier circuit 21 performs full-wave rectification on the voltage between the first and second contacts A and B having received the signals CK and ICK from the controller device 1. The first signal detection circuit 22 extracts a signal component superimposed on the second operation voltage having been rectified by the rectifier circuit 21 and outputs the extracted signal as the first receiving signal RS2.

The second transmitter circuit 23 includes a resistor 23a and a switching element 23b serially connected between the first and second contacts A and B. The switching element 23b is turned on/off in accordance with the second transmitting signal TS2, so as to change the impedance between the first and second contacts A and B. Thus, a signal is sent to the controller device 1.

The clock detection circuit 24 includes an inverter 24a receiving, as its input, the voltage on the first contact A, so as to detect the signal CK output from the controller device 1 and output the detected signal as the operation clock CK2 of the data carrier device 2.

Now, the operation of the data communication system having the aforementioned structure will be described.

Figure 3:
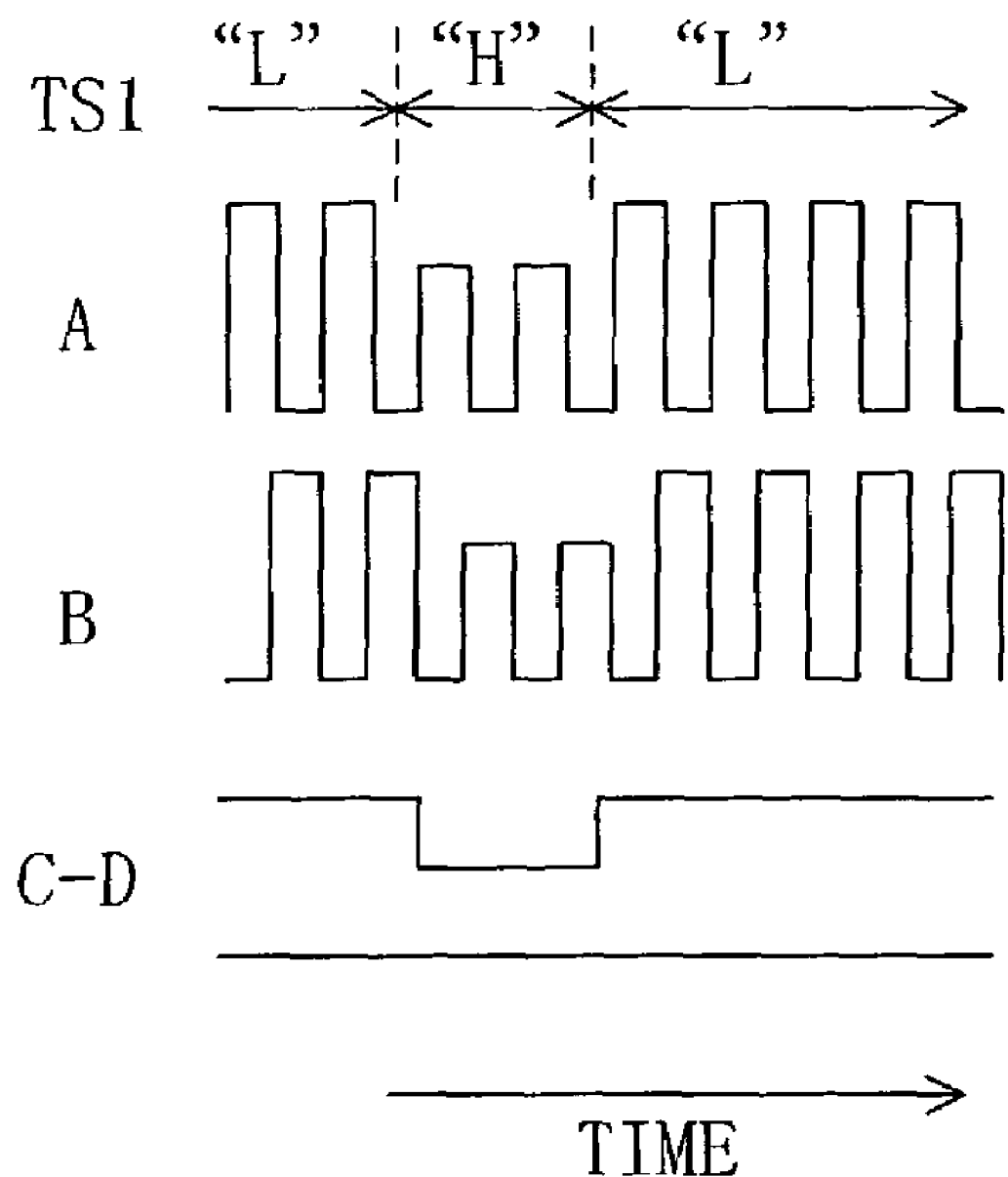
FIG. 3 is a timing chart for showing the operation of the data communication system of FIG. 2.

First, data is transferred from the controller device 1 to the data carrier device 2 as follows:

In the controller device 1, the operation clock CK1 of the controller device 1 is input to the input terminal of the clock generation circuit 12. The inverter 12a outputs the signal CK in the phase the same as that of the operation clock CK1 and the inverter 12b outputs the signal ICK in the phase reverse to that of the operation clock CK1. When the first transmitting signal TS1 is at a "L" level, the MOS transistor 14a of the first transmitter circuit 14 is in an on state. Therefore, the first operation voltage Vout output from the voltage level generation circuit 13 is R3/(R1+R3) times as high as the voltage from the power supply line 11. On the other hand, when the first transmitting signal TS1 is at a "H" level, the MOS transistor 14a is in an off state. Therefore, the first operation voltage Vout is R3/(R1+R2+R3) times as high as the voltage from the power supply line 11, which is lower than the voltage obtained when the signal TS1 is at a "L" level. In other words, when the first transmitting signal TS1 is at a "L" level, the amplitude of the signals CK and ICK is large, and when the signal TS1 is at a "H" level, the amplitude is small. The signals CK and ICK are output respectively to the first and second contacts A and B as shown in FIG. 3.

The data carrier device 2 receives the signals CK and ICK from the first and second contacts A and B. The signals CK and ICK are subjected to the full-wave rectification by the rectifier circuit 21, so as to generate the second operation voltage used for operating the data carrier device 2. Since a signal is superimposed on this rectified second operation voltage as shown in FIG. 3 (as C–D), a voltage difference between terminals C and D is extracted by the first signal detection circuit 22, so as to reconstitute the transferred signal as the first receiving signal RS2.

Next, data is transferred from the data carrier device 2 to the controller device 1 as follows:

In the data carrier device 2, when the second transmitting signal TS2 is at a "L" level, the switching element 23b of the second transmitter circuit 23 is turned on, and therefore, the impedance between the first and second contacts A and B becomes small. On the other hand, when the second transmitting signal TS2 is at a "H" level, the switching element 23b is turned off, and therefore, the impedance between the contacts A and B becomes large. Accordingly, the amplitude of the signals CK and ICK on the contacts A and B is small when the second transmitting signal TS2 is at a "L" level and is large when the signal TS2 is at a "H" level.

The controller device 1 extracts the change of the amplitude of the signal ICK on the second contact B by the second signal detection circuit 15, so as to reconstitute the signal having been transferred from the data carrier device 2 as the second receiving signal RS1.

In this manner, in the data communication system having the structure of FIG. 2, the data carrier device 2 obtains the second operation voltage corresponding to the operation voltage thereof and the operation clock thereof on the basis of the signals CK and ICK sent from the controller device 1 through the contacts A and B. Also, the controller device 1 and the data carrier device 2 transfer data to each other by using the amplitude change of the signals CK and ICK. In other words, supply of the power and the clock from the controller device 1 to the data carrier device 2 and two-way serial data communication between these devices can be both executed through merely two contacts.

Embodiment 2

Figure 4:
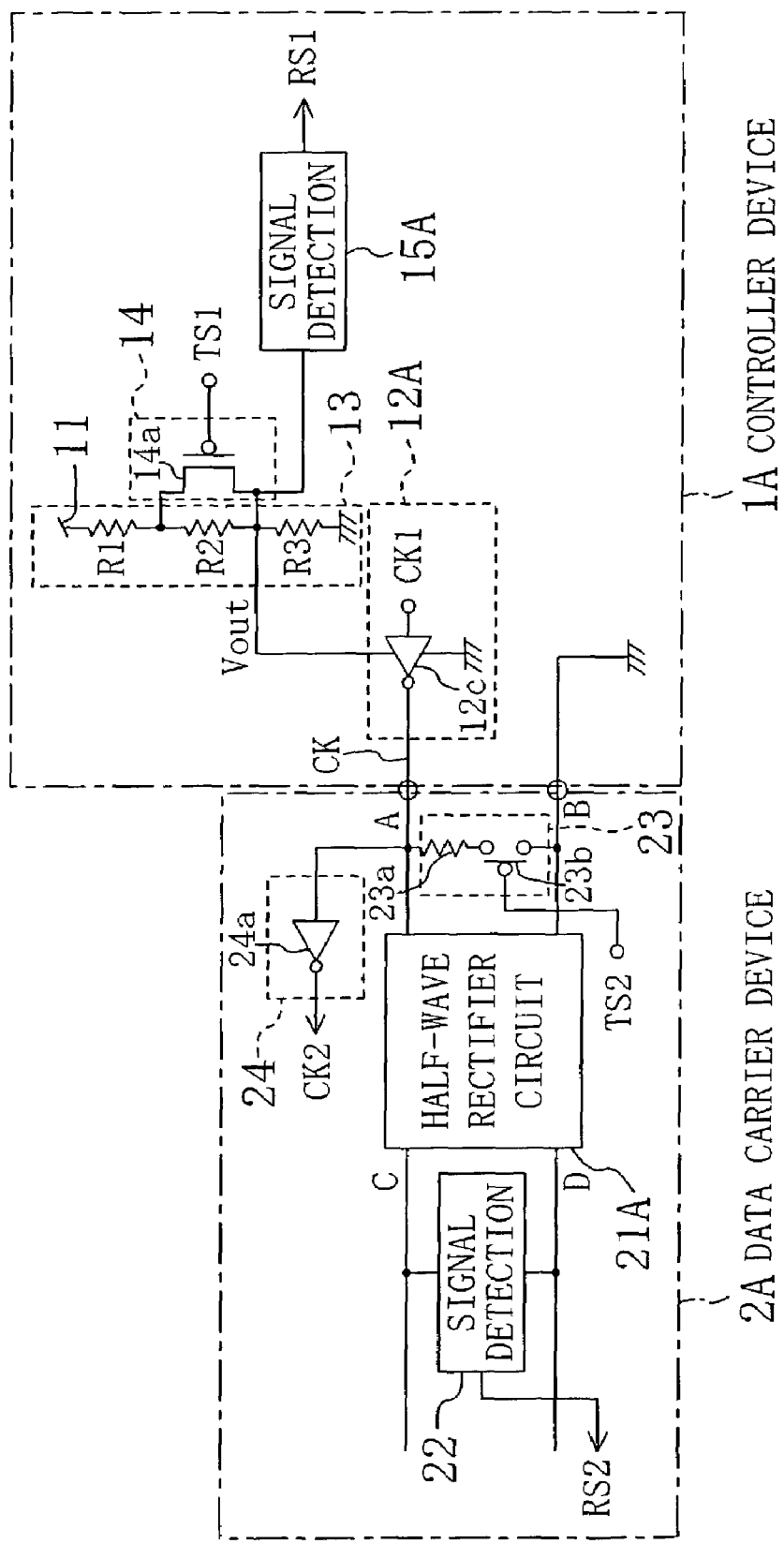
FIG. 4 is a diagram for showing the structure of a data communication system according to Embodiment 2 of the invention.

FIG. 4 shows the structure of a data communication system according to Embodiment 2 of the invention. In FIG. 4, like reference numerals are used to refer to like elements shown in FIG. 2 and the detailed description is omitted.

As compared with the structure of FIG. 2, in a controller device 1A of FIG. 4, a clock generation circuit 12A that outputs the signal CK alone but does not output the signal ICK is provided instead of the clock generation circuit 12. Also, a second signal detection circuit 15A for detecting, as the second receiving signal RS1, change of the voltage amplitude on the terminal for outputting the first operation voltage Vout of the voltage level generation circuit 13 is provided instead of the second signal detection circuit 15. The clock generation circuit 12A includes one inverter 12c, so as to output a signal in a phase reverse to that of the operation clock CK1 of the controller device 1A as the signal CK to the first contact A. The amplitude of the signal CK is changed in accordance with the first transmitting signal TS1 in the same manner as in the structure of FIG. 2. Also, the second contact B is supplied with a ground voltage.

Furthermore, in a data carrier device 2A of FIG. 4, a rectifier circuit 21A that performs half-wave rectification on the signal CK having been sent to the first contact A is provided instead of the rectifier circuit 21 that performs the full-wave rectification. A second operation voltage obtained through the half-wave rectification by the rectifier circuit 21A is used as the operation voltage of the data carrier device 2A.

Now, the operation of the data communication system having the aforementioned structure will be described.

Figure 5:
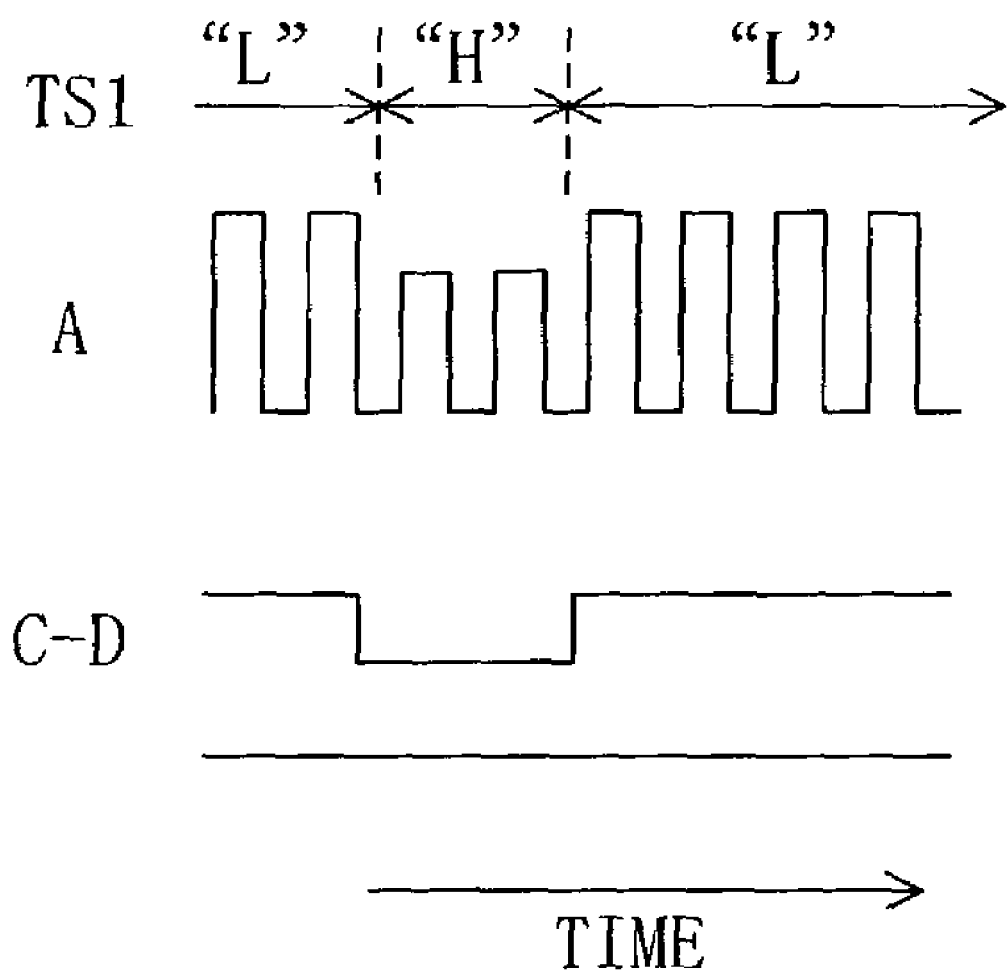
FIG. 5 is a timing chart for showing the operation of the data communication system of FIG. 4.

First, data is transferred from the controller device 1A to the data carrier device 2A as follows:

In the controller device 1A, the operation clock CK1 of the controller device 1A is input to the input terminal of the clock generation circuit 12A, and the signal CK in the phase reverse to that of the operation clock CK1 is output from the inverter 12c. Therefore, in the same manner as in the operation of the data communication system of FIG. 2, the amplitude of the signal CK is large when the first transmitting signal TS1 is at a "L" level and is small when the signal TS1 is at a "H" level. The signal CK is output to the first contact A as shown in FIG. 5.

The data carrier device 2A receives the signal CK from the first contact A. The signal CK is subjected to the half-wave rectification by the rectifier circuit 21A, so as to generate the second operation voltage for operating the data carrier device 2A. Since a signal is superimposed on this rectified second operation voltage as shown in FIG. 5 (as C–D), a voltage difference between the terminals C and D is extracted by the first signal detection circuit 22, so as to reconstitute the transferred signal as the first receiving signal RS2.

On the other hand, data is transferred from the data carrier device 2A to the controller device 1A as follows:

In the data carrier device 2A, in the same manner as in the operation of the data communication system of FIG. 2, the amplitude of the signal CK on the first contact A is small when the second transmitting signal TS2 is at a "L" level because the impedance between the contacts A and B is small in this case. On the contrary, when the signal TS2 is at a "H" level, the impedance between the contacts A and B is large and hence the amplitude of the signal CK is large.

In the controller device 1A, the level of the first operation voltage Vout is changed in accordance with the change of the amplitude of the signal CK on the first contact A. This level change of the first operation voltage is extracted by the second signal detection circuit 15A, so as to reconstitute the transferred signal as the second receiving signal RS1.

In this manner, in the data communication system of FIG. 4, the data carrier device 2A obtains the second operation voltage corresponding to the operation voltage thereof and the operation clock thereof on the basis of the signal CK having been transferred from the controller device 1A through the contact A. Also, the controller device 1A and the data carrier device 2A transfer data to each other by using the amplitude change of the signal CK. In other words, the supply of the power and the clock to the data carrier device 2A from the controller device 1A and the two-way serial data communication between these devices can be executed through the two contacts alone.

Figure 6:
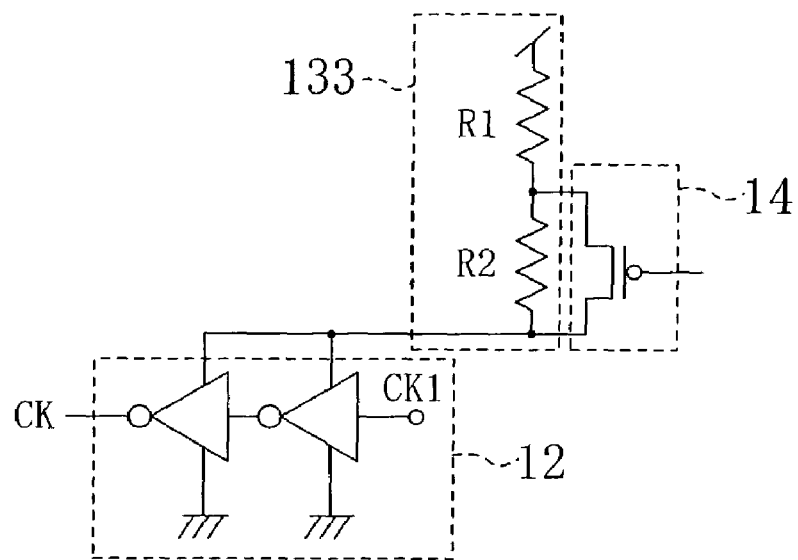
FIG. 6 is a diagram for showing another configuration of a voltage level generation circuit of FIG. 2.

The voltage level generation circuit 13 includes the three resistors in Embodiments 1 and 2, but the number of resistors may be different. For example, the voltage level generation circuit 13 may include merely two resistors R1 and R2 with the resistor R3 omitted. In this case, for example, a voltage level generation circuit 133 including the two resistors is serially connected to the clock generation circuit 12 as shown in FIG. 6. Furthermore, although the first operation voltage Vout is output from the end of the resistor between the resistors R2 and R3 in Embodiments 1 and 2, it may be output from another end. For example, the first operation voltage Vout may be output from the end between the resistors R1 and R2.

Moreover, in the data communication system of FIG. 2, the second signal detection circuit 15 may be connected to the first contact A or to the terminal for outputting the first operation voltage Vout of the voltage level generation circuit 13. Also, in the data communication system of FIG. 4, the second signal detection circuit 15A may be connected to either the first or second contact A or B.

Figure 7A:
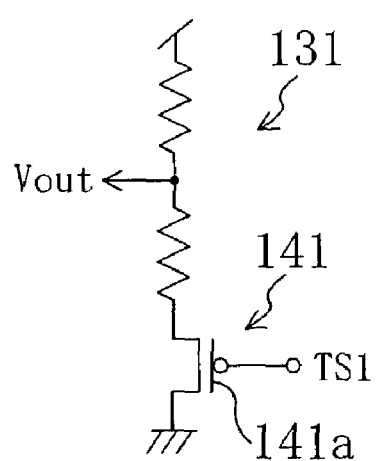
FIGS. 7A and 7B are diagrams for showing other configurations of a first transmitter circuit of FIG. 2.
Figure 7B:
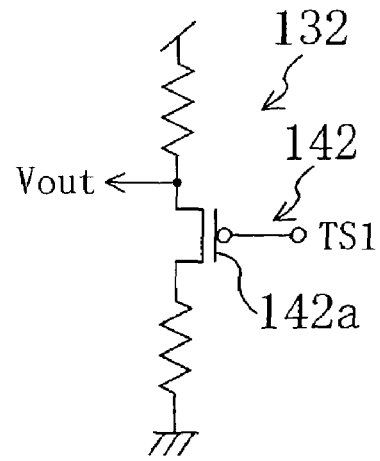

Furthermore, as shown in FIGS. 7A and 7B, a switching element 141a or 142a included in a first transmitter circuit 141 or 142 may be serially connected to at least one of the plural resistors included in a voltage level generation circuit 131 or 132.

Embodiment 3

Figure 8:
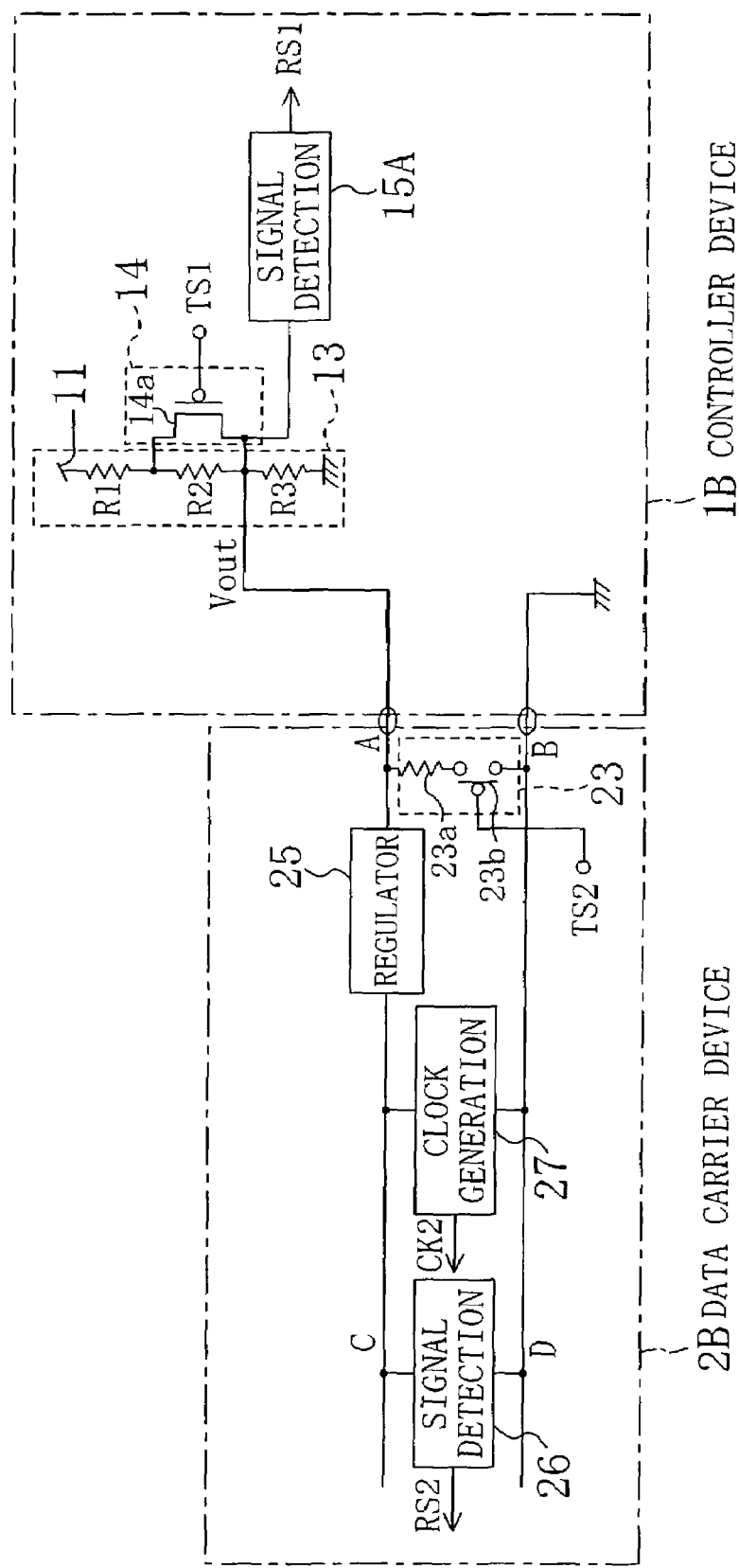
FIG. 8 is a diagram for showing the structure of a data communication system according to Embodiment 3 of the invention.

FIG. 8 shows the structure of a data communication system according to Embodiment 3 of the invention. In FIG. 8, like reference numerals are used to refer to like elements used in FIG. 2 or 4, and the detailed description is omitted.

As compared with the structure of FIG. 4, in a controller device 1B of the data communication system of FIG. 8, the clock generation circuit 12A is omitted and the output voltage Vout of the voltage level generation circuit 13 is output to the first contact A as a signal voltage.

Also, a data carrier device 2B of FIG. 8 includes, in addition to the second transmitter circuit 23, a series regulator 25 for stabilizing an operation voltage generated from the signal voltage Vout supplied from the controller device 1B to the first contact A; a first signal detection circuit 26 for detecting change of the signal voltage between the first and second contacts A and B as the first receiving signal RS2; and a clock generation circuit 27 for generating the operation clock CK2 of the data carrier device 2B.

The series regulator 25 stabilizes the voltage on the terminal C so as to minimize the variation of the voltage, and supplies the stabilized voltage as the operation voltage of the data carrier device 2B. The first signal detection circuit 26 detects the change of the signal voltage Vout, so as to reconstitute the transmitted signal as the first receiving signal RS2. The clock generation circuit 27 generates the operation clock CK2 when the voltage is applied to the data carrier device 2B.

Now, the operation of the data communication system having the aforementioned structure will be described.

Figure 9:
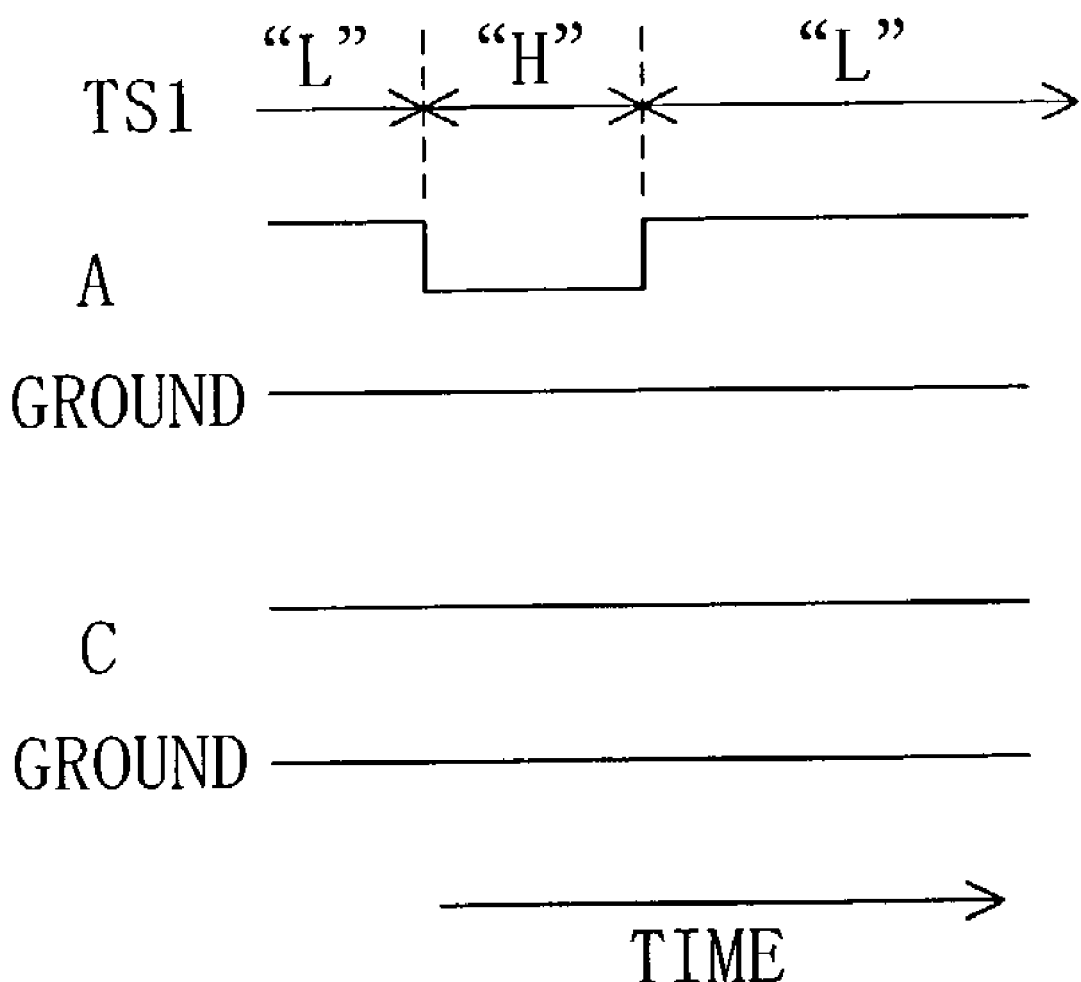
FIG. 9 is a timing chart for showing the operation of the data communication system of FIG. 8.

First, data is transferred from the controller device 1B to the data carrier device 2B as follows:

In the controller device 1B, when the first transmitting signal TS1 is at a "L" level, the MOS transistor 14a of the first transmitter circuit 14 is in an on state. Therefore, the signal voltage Vout output from the voltage level generation circuit 13 is R3/(R1+R3) times as high as the voltage from the power supply line 11. On the contrary, when the first transmitting signal TS1 is at a "H" level, the MOS transistor 14a is in an off state. Therefore, the signal voltage Vout is R3/(R1+R2+R3) times as high as the voltage from the power supply line 11, which is lower than the signal voltage obtained when the signal TS1 is at a "L" level. In other words, the signal voltage Vout is output to the first contact A as shown in FIG. 9.

The data carrier device 2B detects the change of the signal voltage Vout on the first contact A by the first signal detecting circuit 26, so as to reconstitute the transferred signal as the first receiving signal RS2. Also, the serial regulator 25 stabilizes the voltage on the terminal C as shown in FIG. 9. Furthermore, the clock generation circuit 27 generates the operation clock CK2 in accordance with the application of the signal voltage Vout having been sent from the controller device 1B.

On the other hand, data is transferred from the data carrier device 2B to the controller device 1B as follows:

In the data carrier device 2B, the signal voltage Vout on the first contact A is small when the second transmitting signal TS2 is at a "L" level because the impedance between the contacts A and B is small in this case. On the contrary, when the signal TS2 is at a "H" level, the signal voltage Vout is large because the impedance between the contacts A and B is large. The controller device 1B extracts the change of the signal voltage Vout by the second signal detection circuit 15A, so as to reconstitute the transferred signal as the second receiving signal RS1.

In this manner, in the data communication system of FIG. 8, the data carrier device 2B obtains the operation voltage thereof on the basis of the signal voltage Vout sent from the controller device 1B through the contact A. Also, the controller device 1B and the data carrier device 2B transfer data to each other by using the change of the signal voltage Vout. In other words, the supply of the power to the data carrier device 2B from the controller device 1B and the two-way serial data communication between these devices can be both executed through the two contacts alone.

Although the voltage level generation circuit 13 includes the three resistors in this embodiment, the number of resistors may be different. For example, the resistors R1 and R2 alone may be included with the resistor R3 omitted. Furthermore, although the signal voltage Vout is output from the end between the resistors R2 and R3 in this embodiment, the signal voltage may be output from another end. For example, the signal voltage Vout may be output from the end between the resistors R1 and R2.

Embodiment 4

Figure 10:
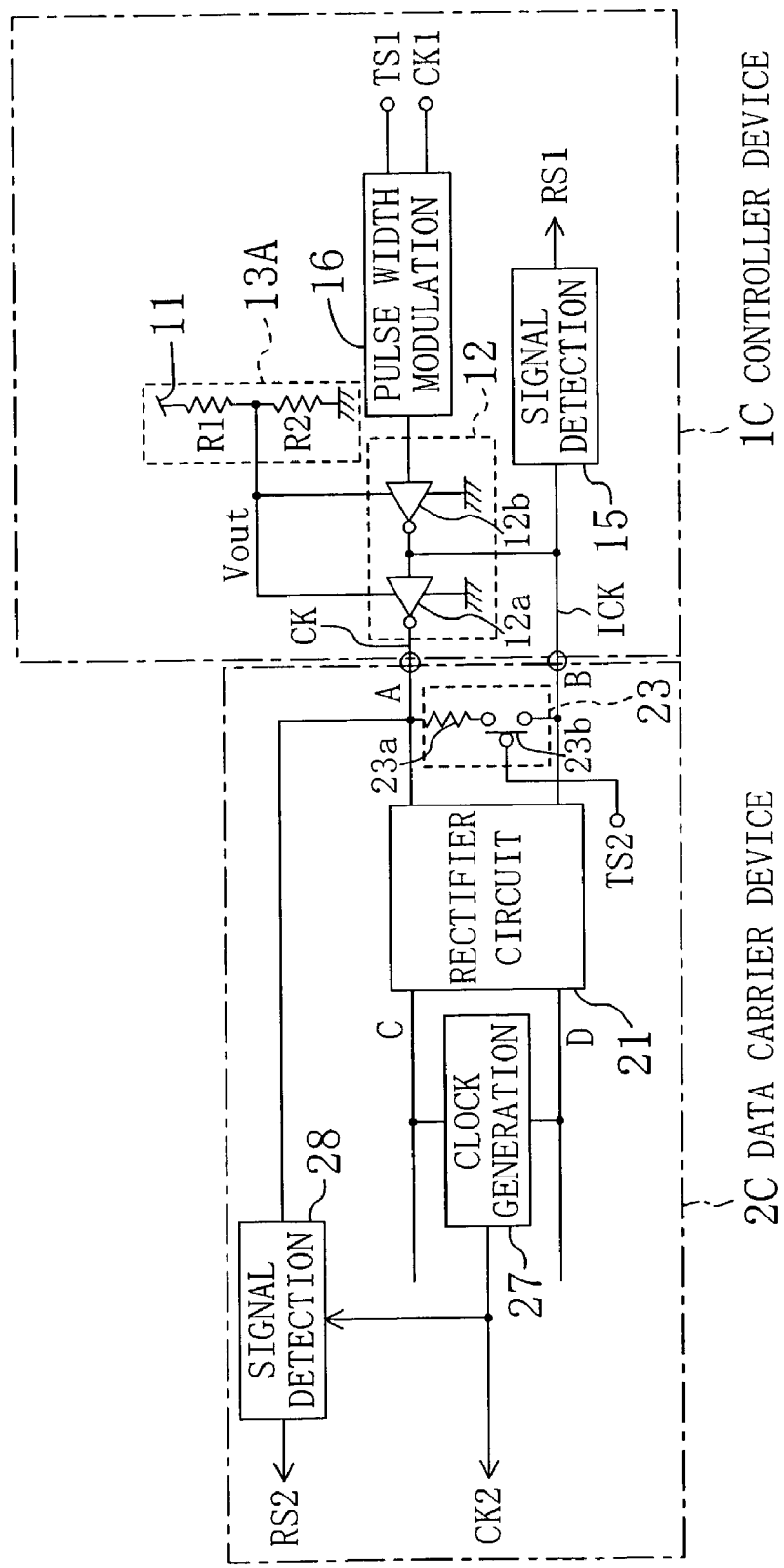
FIG. 10 is a diagram for showing the structure of a data communication system according to Embodiment 4 of the invention.

FIG. 10 shows the structure of a data communication system according to Embodiment 4 of the invention. In FIG. 10, like reference numerals are used to refer to like elements shown in FIG. 2 or 8, and the detailed description is omitted.

As compared with the structure shown in FIG. 2, in the data communication system of FIG. 10, a controller device 1C includes a pulse width modulation circuit 16 for changing, in accordance with the first transmitting signal TS1, the pulse widths of the signals CK and ICK generated by the clock generation circuit 12. The pulse width modulation circuit 16 receives the operation clock CK1 of the controller device 1C as its input, so as to change the pulse width of the operation clock CK1 in accordance with the first transmitting signal TS1. The clock generation circuit 12 generates the signals CK and ICK on the basis of not the operation clock CK1 but a signal output from the pulse width modulation circuit 16. Also, a voltage level generation circuit 13A includes two resistors R1 and R2 for dividing the voltage from the power supply line 11, and outputs a constant first operation voltage Vout from the end between the resistors R1 and R2. The first operation voltage Vout is supplied to the inverters 12a and 12b of the clock generation circuit 12. In other words, both the signals CK and ICK have constant amplitude and are changed in their pulse widths in accordance with the first transmitting signal TS1.

Furthermore, a data carrier device 2C of FIG. 10 includes, in addition to the rectifier circuit 21, the second transmitter circuit 23 and the clock generation circuit 27, a first signal detection circuit 28 for detecting the change of the pulse width of the signal on the first contact A as the first receiving signal RS2. The first signal detection circuit 28 detects the change of the pulse width of the signal CK on the first contact A by using the operation clock CK2 generated by the clock generation circuit 27.

The operation of the data communication system having the aforementioned structure will be described.

Figure 11:
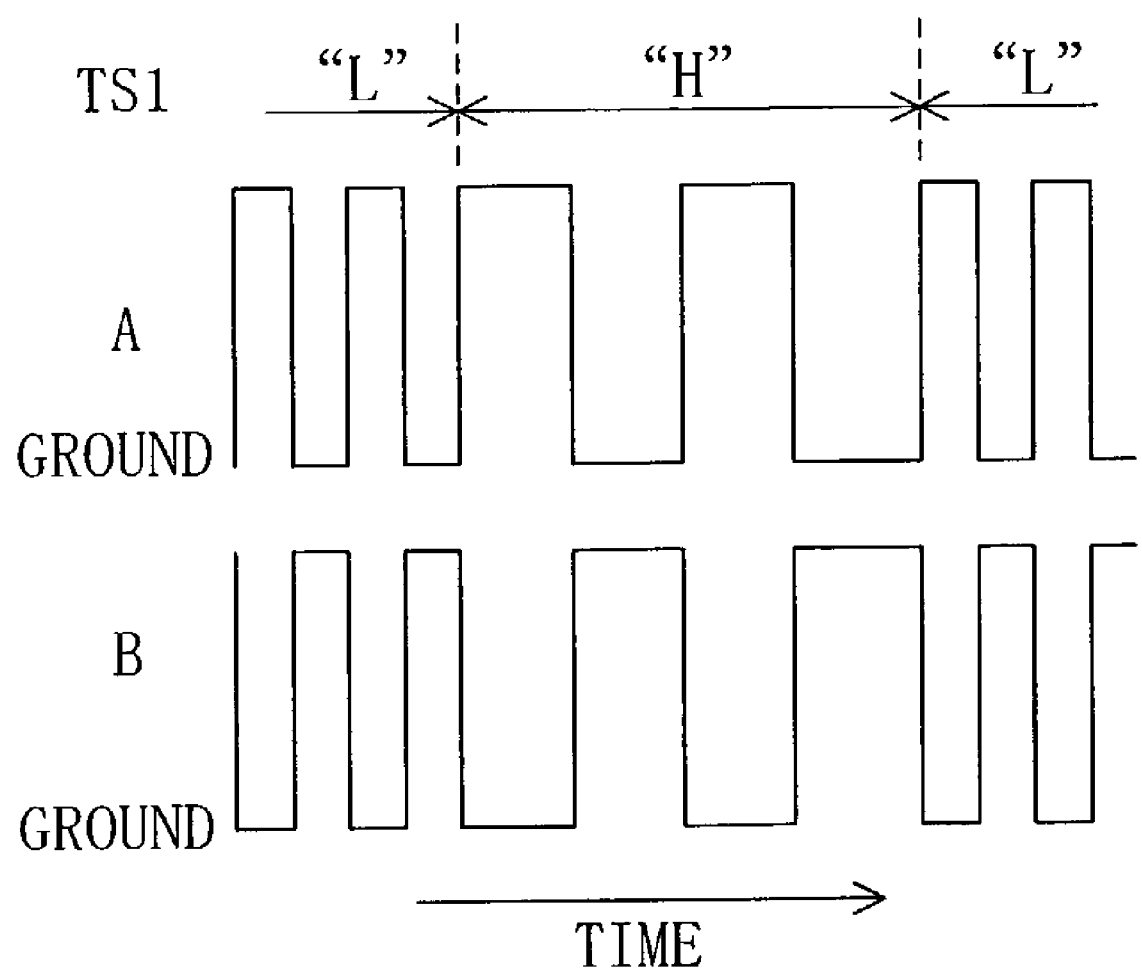
FIG. 11 is a timing chart for showing the operation of the data communication system of FIG. 10.

First, data is transferred from the controller device 1C to the data carrier device 2C as follows:

In the controller device 1C, the pulse width modulation circuit 16 outputs a pulse signal with a pulse width corresponding to the "L" level or the "H" level of the first transmitting signal TS1. The clock generation circuit 12 receives the output of the pulse width modulation circuit 16, and outputs the signal CK in the phase same as that of the pulse signal from the inverter 12a and outputs the signal ICK in the phase reverse to that of the pulse signal from the inverter 12b. The signals CK and ICK are respectively output to the first and second contacts A and B as shown in FIG. 11.

The data carrier device 2C receives the signals CK and ICK from the first and second contacts A and B. The signals CK and ICK are subjected to the full-wave rectification by the rectifier circuit 21, so as to generate the second operation voltage for operating the data carrier device 2C. Also, the clock generation circuit 27 generates the operation clock CK2 in accordance with the application of the rectified second operation voltage.

The first signal detection circuit 28 measures the pulse width of the signal CK supplied from the controller device 1C to the first contact A by using the operation clock CK2 generated by the clock generation circuit 27. The first signal detection circuit 28 determines the correspondence of the measured pulse width to the "L" level or the "H" level of data logic, so as to obtain the first receiving signal RS2.

On the other hand, data is transferred from the data carrier device 2C to the controller device 1C as follows:

In the data carrier device 2C, in the same manner as in the operation of the data communication system of FIG. 2, the amplitude of the signals CK and ICK on the contacts A and B is small when the second transmitting signal TS2 is at a "L" level because the impedance between the contacts A and B is small in this case. On the contrary, when the signal TS2 is at a "H" level, the amplitude of the signals CK and ICK is large because the impedance between the contacts A and B is large in this case.

The controller device 1C extracts the change of the amplitude of the signal ICK on the second contact B by the second signal detection circuit 15, so as to reconstitute the signal having been transferred from the data carrier device 2C as the second receiving signal RS1.

In this manner, in the data communication system of FIG. 10, the data carrier device 2C obtains the second operation voltage corresponding to the operation voltage thereof on the basis of the signals CK and ICK sent from the controller device 1C through the contacts A and B. Also, the controller device 1C transfers data to the data carrier device 2C by using the change of the pulse widths of the signals CK and ICK, and the data carrier device 2C transfers data to the controller device 1C by using the change of the amplitude of the signals CK and ICK. In other words, the supply of the power to the data carrier device 2C from the controller device 1C and the two-way serial data communication between these devices can be both executed through the two contacts alone.

Although the signals CK and ICK are sent from the controller device 1C in the structure of FIG. 10, the signal ICK may not be sent as in the structure of FIG. 4. In this case, the controller device 1C supplies ground potential to the second contact B, and the rectifier circuit 21 of the data carrier device 2C performs the half-wave rectification.

Also, the second signal detection circuit 15 may be connected to the first contact A or the terminal for outputting the first operation voltage Vout of the voltage level generation circuit 13A.

Embodiment 5

Figure 12:
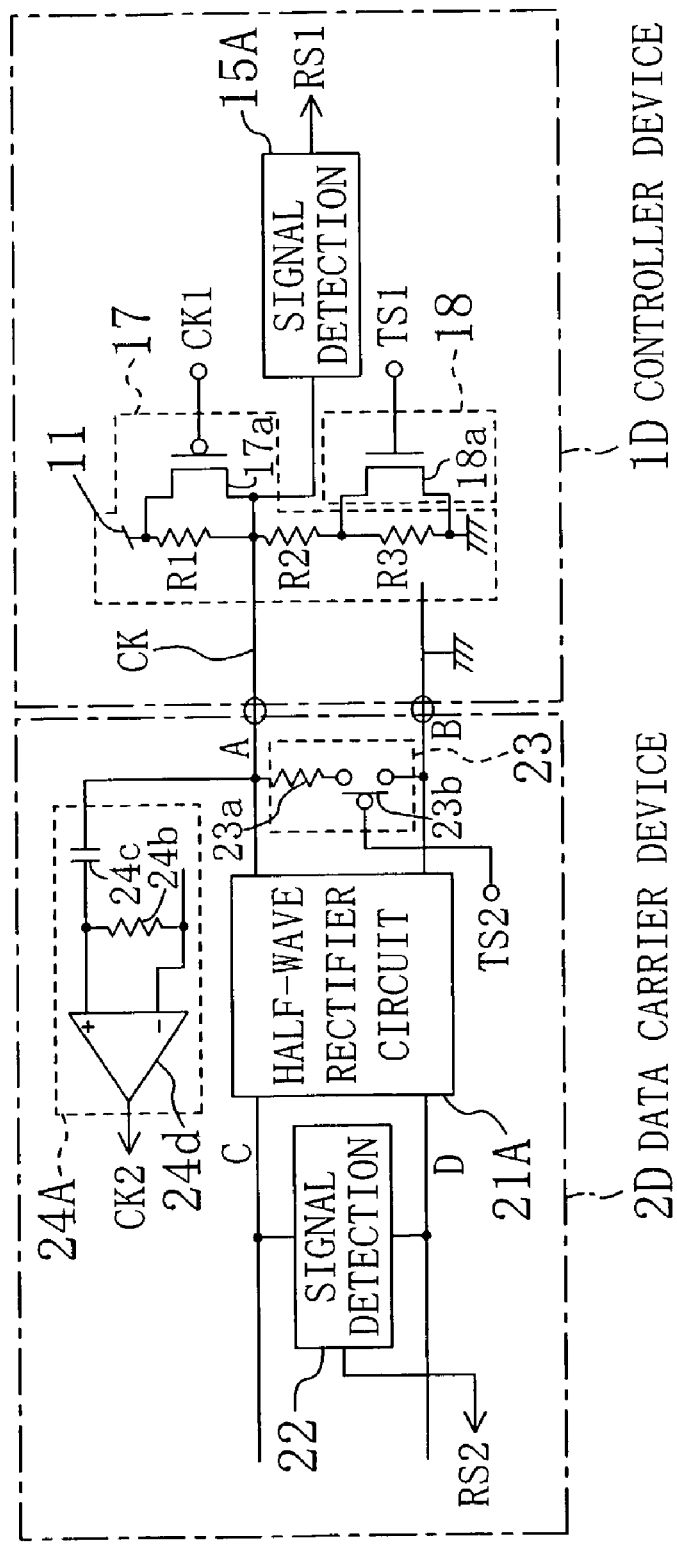
FIG. 12 is a diagram for showing the structure of a data communication system according to Embodiment 5 of the invention.

FIG. 12 shows the structure of a data communication system according to Embodiment 5 of the invention. In FIG. 12, like reference numerals are used to refer to like elements shown in FIG. 4, and the detailed description is omitted.

A controller device 1D of the data communication system of FIG. 12 includes, in addition to the second signal detection circuit 15A, a clock generation circuit 17 receiving a first operation voltage from the power supply line 11 for generating the signal CK; and a first transmitter circuit 18 for changing the lower voltage level of the signal CK in accordance with the first transmitting signal TS1. The signal CK is supplied to the first contact A, and ground potential is supplied to the second contact B.

Also, a data carrier device 2D of FIG. 12 has substantially the same structure as the data carrier device 2A of FIG. 4 except that the clock detection circuit 24 is replaced with a clock detection circuit 24A whose internal configuration is different from that of the clock detection circuit 24.

The clock generation circuit 17 includes three resistors R1, R2 and R3 for dividing the first operation voltage supplied from the power supply line 11, and a MOS transistor 17a connected in parallel to the resistor R1. The gate of the MOS transistor 17a is supplied with the operation clock CK1 of the controller device ID, so that the MOS transistor 17a can be turned on/off in accordance with the change of the voltage level of the operation clock CK1. Therefore, the voltage on the end between the resistors R1 and R2 is changed in synchronization with the operation clock CK1 so as to be output to the first contact A as the signal CK.

The first transmitter circuit 18 includes a MOS transistor 18a connected in parallel to the resistor R3 of the clock generation circuit 17. The gate of the MOS transistor 18a is supplied with the first transmitting signal TS1, so that the MOS transistor 18a can be turned on/off in accordance with the change of the voltage level of the signal TS1. Therefore, the lower voltage level of the signal CK is changed in accordance with the first transmitting signal TS1.

The clock detection circuit 24A includes a differentiation circuit composed of a resistor 24b and a capacitor 24c, and a comparator 24d, The clock detection circuit 24A detects, in the signal CK supplied to the first contact A, the operation clock CK2 of the data carrier device 2D.

Now, the operation of the data communication system having the aforementioned structure will be described.

Figure 13:
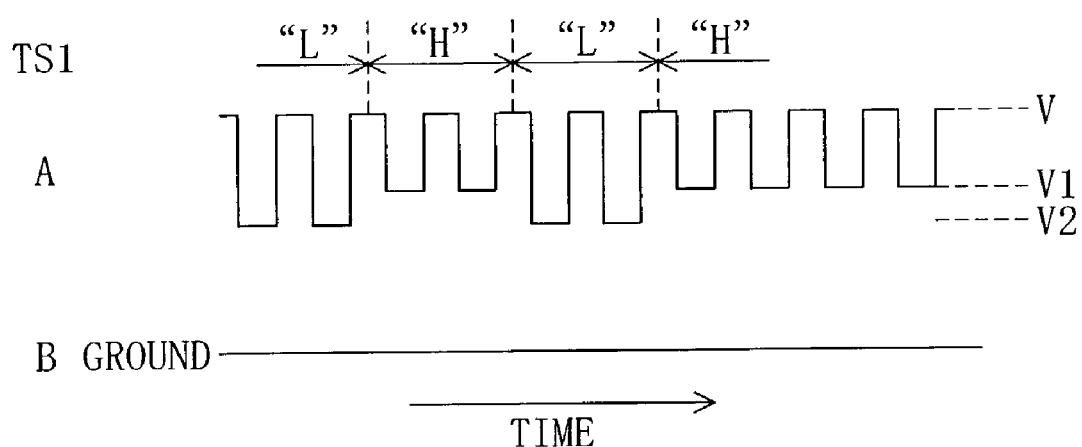
FIG. 13 is a timing chart for showing the operation of the data communication system of FIG. 12.

First, data is transferred from the controller device ID to the data carrier device 2D as follows:

In the controller device ID, the operation clock CK1 of the controller device ID is input to the input terminal of the clock generation circuit 17, and the signal CK is output from the end between the resistors R1 and R2. The higher voltage level of the signal CK substantially accords with the voltage level (V) of the power supply line 11, but the lower voltage level of the signal CK is controlled by the first transmitter circuit 18. Specifically, when the first transmitting signal TS1 is at a "H" level, the MOS transistor 18a of the first transmitter circuit 18 is in an off state, and hence, the lower voltage level of the signal CK is a voltage V1 (=V·(R2+R3)/(R1+R2+R3)). On the contrary, when the first transmitting signal TS1 is at a "L" level, the MOS transistor 18a of the first transmitter circuit 18 is in an on state, and hence, the lower voltage level of the signal CK is a voltage V2 (=V·R2/(R1+R2)), which is lower than the voltage V1. As a result, the signal CK supplied to the first contact A is a pulse signal with a potential difference (V−V1) when the first transmitting signal TS1 is at a "H" level as shown in FIG. 13. On the other hand, when the first transmitting signal TS1 is at a "L" level, the signal CK is a pulse signal with a potential difference (V−V2).

The data carrier device 2D receives the signal CK from the first contact A. The signal CK is subjected to the half-wave rectification by the rectifier circuit 21A, so as to generate the second operation voltage corresponding to the operation voltage of the data carrier device 2D. Since a signal is superimposed on the rectified second operation voltage, a voltage difference between the terminals C and D is extracted by the first signal detection circuit 22, so as to reconstitute the transferred signal as the first receiving signal RS2. Also, the clock detection circuit 24A removes a DC component from the signal CK by using the differentiation circuit and extracts the change of the signal CK, so as to reconstitute the operation clock CK2.

On the other hand, data is transferred from the data carrier device 2D to the controller device ID as follows:

In the controller device ID, with the first transmitting signal TS1 fixed to a "H" level, the operation clock CK1 is supplied to the clock generation circuit 17. In the data carrier device 2D, in the same manner as in the operation of the data communication system of FIG. 2, the amplitude of the signal CK on the first contact A is small when the second transmitting signal TS2 is at a "L" level because the impedance between the contacts A and B is small in this case. On the contrary, when the signal TS2 is at a "H" level, the amplitude is large because the impedance between the contacts A and B is large in this case. The controller device ID extracts the change of the voltage on the first contact A by the second signal detection circuit 15A, so as to reconstitute the transferred signal as the second receiving signal RS1.

In this manner, in the data communication system of FIG. 12, the data carrier device 2D obtains the second operation voltage corresponding to the operation voltage thereof and the operation clock thereof on the basis of the signal CK sent from the controller device ID through the contact A. Also, the controller device ID transfers data to the data carrier device 2D by using the change of the lower voltage level of the signal CK, and the data carrier device 2D transfers data to the controller device ID by using the change of the amplitude of the signal CK. In other words, the supply of the power and the clock to the data carrier device 2D from the controller device ID and the two-way serial data communication between these devices can be both executed through the two contacts alone.

Although the controller device ID herein transfers data to the data carrier device 2D by using the change of the lower voltage level of the signal CK, data may be transferred by changing the higher voltage level of the signal CK instead.

Also, in the structure of FIG. 12, the signal ICK may be sent from the controller device ID as in the structure of FIG. 2. In this case, the half-wave rectifier circuit 21A of the data carrier device 2D is replaced with a full-wave rectifier circuit.

Embodiment 6

Figure 14:
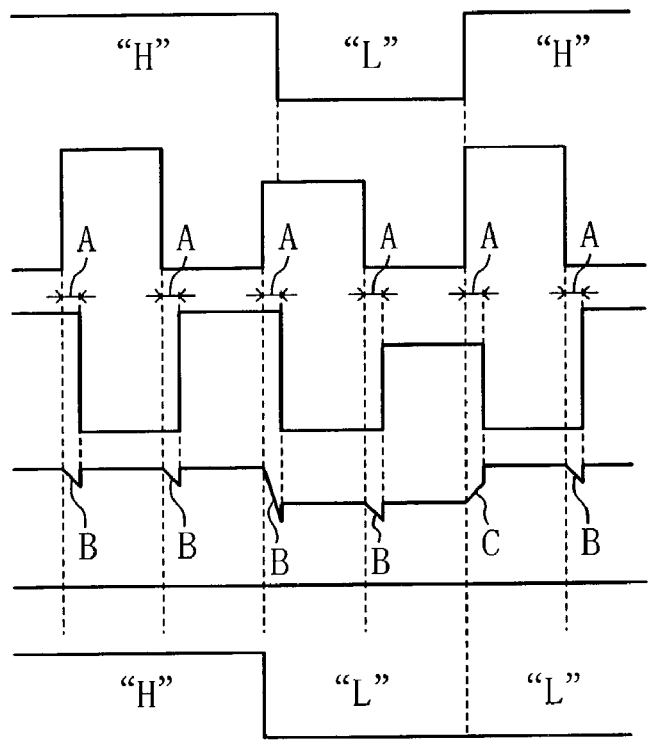
FIGS. 14A, 14B, 14C, 14D and 14E are timing charts for showing timing at which error data is extracted by a data carrier device.

In the data communication system having the structure shown in FIG. 2, the timing of changing the logical level of the first transmitting signal TS1 accords with the timings of generating the edges of the signals CK and ICK. However, the timings of generating the edges of the signals CK and ICK are not strictly simultaneous but there is a small skew between these signals. FIG. 14A shows an example of the first transmitting signal TS1. FIGS. 14B and 14C respectively show the signals ICK and CK generated on the basis of the first transmitting signal TS1. As shown in FIGS. 14B and 14C, there is a skew A between the signals CK and ICK.

Since the data carrier device 2 cannot temporarily obtain the power supplied from the controller device 1 during the skew A, there arises a glitch in the second operation voltage Vin generated by the rectifier circuit 21. FIG. 14D shows the second operation voltage Vin. As shown in FIG. 14D, a glitch B is caused in the second operation voltage Vin. When the glitch B of the second operation voltage Vin overlaps the rise of the voltage of the first transmitting signal TS1, rounding C is caused in the second operation voltage Vin as shown in FIG. 14D. It is difficult to extract a signal during the rounding C and may be impossible to accurately extract a signal during the rounding C. Accordingly, as shown in FIG. 14E, a first receiving signal RS2, which should be at a "H" level, is extracted as a signal at a "L" level due to such error extraction during the rounding C.

Figure 15:
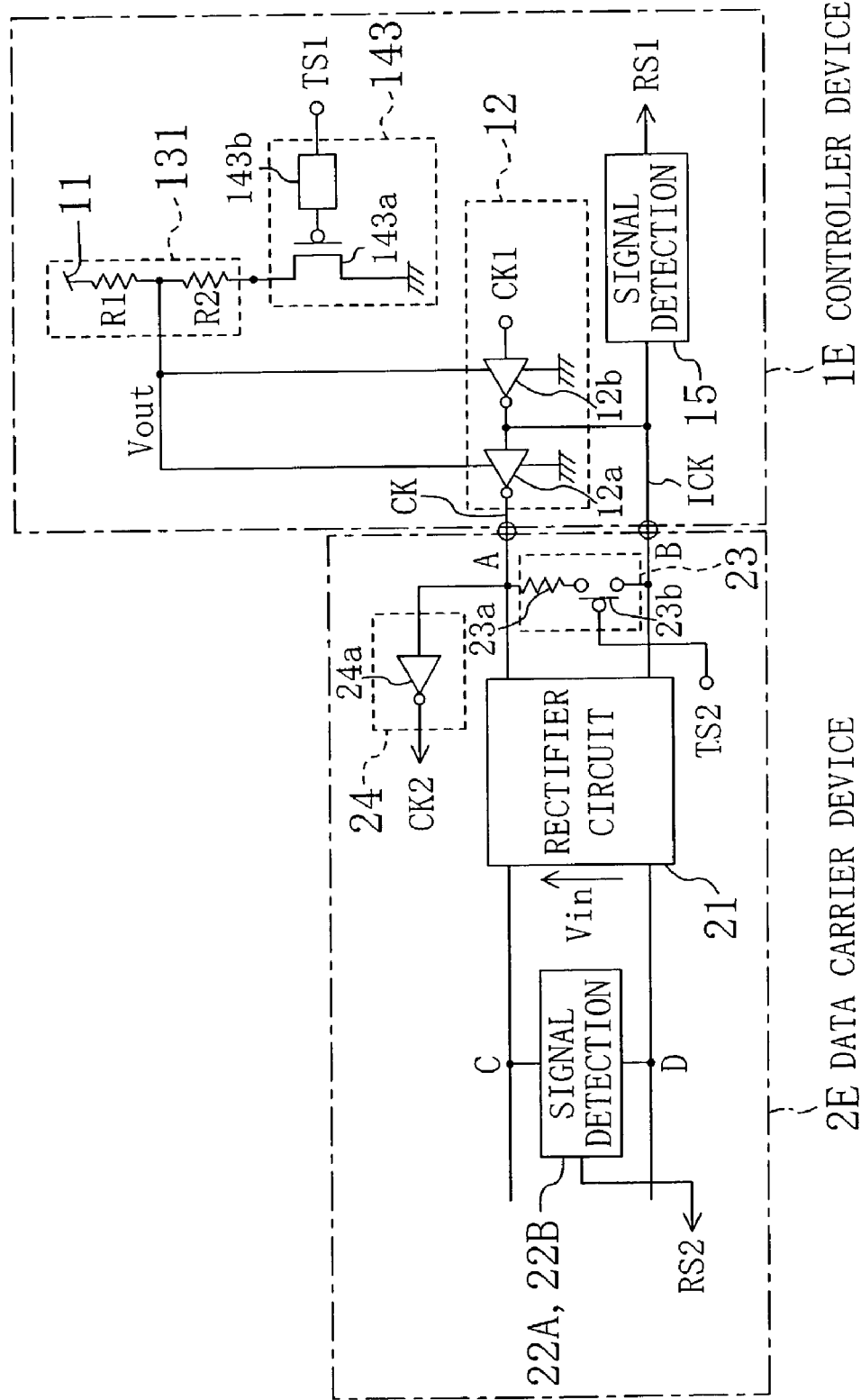
FIG. 15 is a diagram for showing the structure of a data communication system according to Embodiment 6 of the invention.

FIG. 15 shows the structure of a data communication system according to Embodiment 6 of the invention. The data communication system of this embodiment aims for overcoming the aforementioned problem, so that data transferred from a controller device 1E to a data carrier device 2E can be easily and accurately extracted. In FIG. 15, like reference numerals are used to refer to like elements shown in FIG. 2 or 7, and the detailed description is omitted.

As compared with the structure of FIG. 2, in the controller device 1E of the data communication system of FIG. 15, the voltage level generation circuit 131 of FIG. 7A is provided instead of the voltage level generation circuit 13. Also, a first transmitter circuit 143 is provided instead of the first transmitter circuit 14. Furthermore, in the data carrier device 2E of FIG. 15, a first signal detection circuit 22A is provided instead of the first signal detection circuit 22.

The first transmitter circuit 143 includes a MOS transistor 143a working as a switching element and an edge generation timing adjusting mechanism 143b. The edge generation timing adjusting mechanism 143b receives the first transmitting signal TS1 as its input, so as to supply the gate of the MOS transistor 143a with a signal with shifted edge generation timing. Also, the MOS transistor 143a is connected, at its source, to the resistor R2 of the voltage level generation circuit 131 and connected, at its drain, to reference potential GND. The MOS transistor 143a determines the first operation voltage Vout output from the voltage level generation circuit 131 in accordance with the signal input to its gate.

Figure 16:
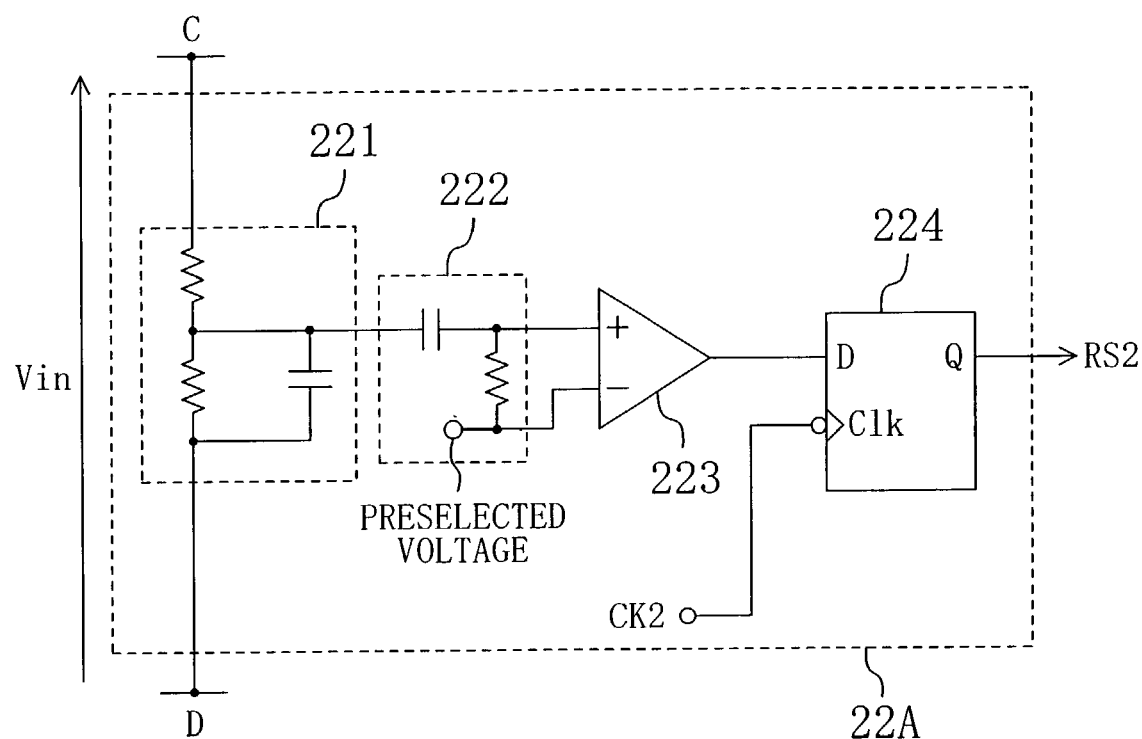
FIG. 16 is a diagram for showing the configuration of a first signal detection circuit used in the data communication system of FIG. 15.

FIG. 16 shows the configuration of the first signal detection circuit 22A. The first signal detection circuit 22A includes a low-pass filter 221, a high-pass filter 222, a comparator 223 and a D-type flip-flop 224, so as to extract a signal component superimposed on the second operation voltage Vin generated by the rectifier circuit 21 and output the extracted signal as the first receiving signal RS2.

In the data communication system having the aforementioned structure, data transfer from the controller device 1E to the data carrier device 2E will be described in detail with reference to the timing charts of FIGS. 17A through 17J.

The first transmitter circuit 143 receives the first transmitting signal TS1 in synchronization with the operation clock CK1 (as shown in FIGS. 17A and 17B). The edge generation timing adjusting mechanism 143b of the first transmitter circuit 143 shifts the edge of the first transmitting signal TS1 from the edge of the operation clock CK1, so as to apply the gate voltage of the MOS transistor 143a. As a result, the first operation voltage Vout is shifted in the edge generation timing from the operation clock CK1 (as shown in FIG. 17C). The extent of shifting the edge generation timing of the first transmitting signal TS1 is larger than the duration of the skew A.

The amplitude of the signals CK and ICK generated by the clock generation circuit 12 is small when the first operation voltage Vout is low and is large when the voltage Vout is high (as shown in FIGS. 17D and 17E). Since the edge generation timing of the first operation voltage Vout is shifted from the duration of the skew A, the voltage change corresponding to the edge of the first operation voltage Vout appears in a portion of either the signal CK or the signal ICK where its voltage level is stable. FIG. 17D shows the case where the voltage change corresponding to the edge of the first operation voltage Vout appears in the signal ICK. The data carrier device 2E obtains the second operation voltage Vin by rectifying the thus generated signals CK and ICK by the rectifier circuit 21. There is no rounding in the second operation voltage Vin thus generated (as shown in FIG. 17F).

Next, extraction of data superimposed on the second operation voltage Vin by the first signal detection circuit 22A will be described.

First, the second operation voltage Vin is input to the low-pass filter 221, so as to remove noise (such as a voltage glitch derived from the skew A). Next, the signal having passed through the low-pass filter 221 is input to the high-pass filter 222, so as to remove a DC component and detect the edge. Thereafter, the signal having passed through the high-pass filter 222 is input to the comparator 223 with hysteresis. FIG. 17G shows the signal having passed through the high-pass filter 222 and the preselected voltage and the hysteresis levels of the comparator 223. A signal exceeding the predetermined high (or low) hysteresis level is extracted by the comparator 223 as a signal at a "H" (or "L") logical level (as shown in FIG. 17H). Ultimately, the output of the comparator 223 is input to the D-type flip-flop 224, so as to be output as the first receiving signal RS2 in synchronization with the glitch of the operation clock CK2 generated by the clock detection circuit 24 (as shown in FIGS. 17I and 17J).

When the first transmitting signal TS1 is superimposed on the signals CK and ICK in this manner, the rounding in the change of the second operation voltage Vin can be prevented. Therefore, data superimposed on the second operation voltage Vin can be accurately extracted. Also, the data extraction can be eased by detecting the edge of the second operation voltage Vin. Furthermore, since the voltage change corresponding to the edge of the first operation voltage Vout appears in one of the signals CK and ICK, data can be extracted from merely one of the signals. Accordingly, the rectifier circuit 21 may be a half-wave rectifier. When the rectifier circuit 21 is a half-wave rectifier, the number of components can be reduced, so that the data carrier device 2E can be further downsized.

Next, another exemplified generation of the signals CK and ICK will be described with reference to the timing charts of FIGS. 18A through 18J.

The first transmitter circuit 143 receives the first transmitting signal TS1 in synchronization with the operation clock CK1 (as shown in FIGS. 18A and 18B). The edge generation timing adjusting mechanism 143b of the first transmitter circuit 143 shifts the edge of the first transmitting signal TS1 from the edge of the operation clock CK1, so as to apply the gate voltage of the MOS transistor 143a. At this point, the edge timing is shifted so that the rise edge can be generated when the operation clock CK1 is at a high potential level and the glitch edge can be generated when the operation clock CK1 is at a low potential level. As a result, the first operation voltage Vout is shifted in the edge generation timing from the operation clock CK1 (as shown in FIG. 18C). Also, there arises a difference between the pulse widths of the first operation voltage Vout respectively corresponding to the logical "H" level and the logical "L" level of the first transmitting signal TS1. In FIG. 18C, the pulse width corresponding to the logical "L" level is shorter than that corresponding to the logical "H" level. The extent of the shift of the edge generation timing of the first transmitting signal TS1 is larger than the duration of the skew A.

The amplitude of the signals CK and ICK generated by the clock generation circuit 12 is small when the first operation voltage Vout is low and is large when the voltage Vout is high (as shown in FIGS. 18D and 18E). Since the edge generation timing of the first operation voltage Vout is shifted from the duration of the skew A, the voltage change corresponding to the rise edge of the first operation voltage Vout appears in a portion of one of the signal CK and the signal ICK where its voltage level is stable and the voltage change corresponding to the glitch edge appears in a portion of the other signal where its voltage level is stable. In FIGS. 18D and 18E, the voltage change corresponding to the rise edge of the first operation voltage Vout appears in the signal CK and the voltage change corresponding to the glitch edge appears in the signal ICK. The data carrier device 2E obtains the second operation voltage Vin by rectifying the thus generated signals CK and ICK by the rectifier circuit 21. There is no rounding in the change of the thus generated second operation voltage Vin (as shown in FIG. 18F).

Next, the extraction of data superimposed on the second operation voltage Vin by the second signal detection circuit 22A will be described.

First, the second operation voltage Vin is input to the low-pass filter 221, so as to remove noise (such as a voltage glitch derived from the skew A). Then, the signal having passed through the low-pass filter 221 is input to the high-pass filter 222, so as to remove a DC component and detect the edge. Thereafter, the signal having passed through the high-pass filter 222 is input to the comparator 223 with hysteresis. FIG. 18G shows the signal having passed through the high-pass filter 222 and the preselected voltage and the hysteresis levels of the comparator 223. A signal exceeding the predetermined high (or low) hysteresis level is extracted by the comparator 223 as a signal at a logical "H" (or "L") level (as shown in FIG. 18H). Ultimately, the output of the comparator 223 is input to the D-type flip-flop 224, so as to be output as the first receiving signal RS2 in synchronization with the glitch of the operation clock CK2 generated by the clock detection circuit 24 (as shown in FIGS. 18I and 18J).

When the first transmitting signal TS1 is superimposed on the signals CK and ICK in this manner, the rounding in the change of the second operation voltage Vin can be prevented. Therefore, data superimposed on the second operation voltage Vin can be accurately extracted. Also, the data extraction can be eased by detecting the edge of the second operation voltage Vin. Furthermore, since the pulse width of the first operation voltage Vout corresponding to the logical "L" level of the first transmitting signal TS1 is shorter than that corresponding to the logical "H" level of the first transmitting signal TS1, a current flowing through the resistor R2 of the voltage level generation circuit 131 when the logical level is "L" can be reduced, resulting in reducing the consumed power of the entire system.

In the case where the voltage level generation circuit 131 and the first transmitter circuit 143 have structures in which larger power is consumed when the logical level of the first transmitting signal TS1 is "H" than when it is "L", the pulse width of the first operation voltage Vout corresponding to the "H" level is made shorter than that corresponding to the "L" level contrary to the above description. Thus, the consumed power of the entire system can be reduced.

Although the ratio between the first transmitting signal TS1 and the operation clock CK1 is 1:1 in this embodiment, the ratio may be 1:N (wherein N is an integer of 2 or more).

Embodiment 7

In a data communication system according to Embodiment 7 of the invention, the first signal detection circuit 22A of FIG. 15 is replaced with a first signal detection circuit 22B.

Figure 19:
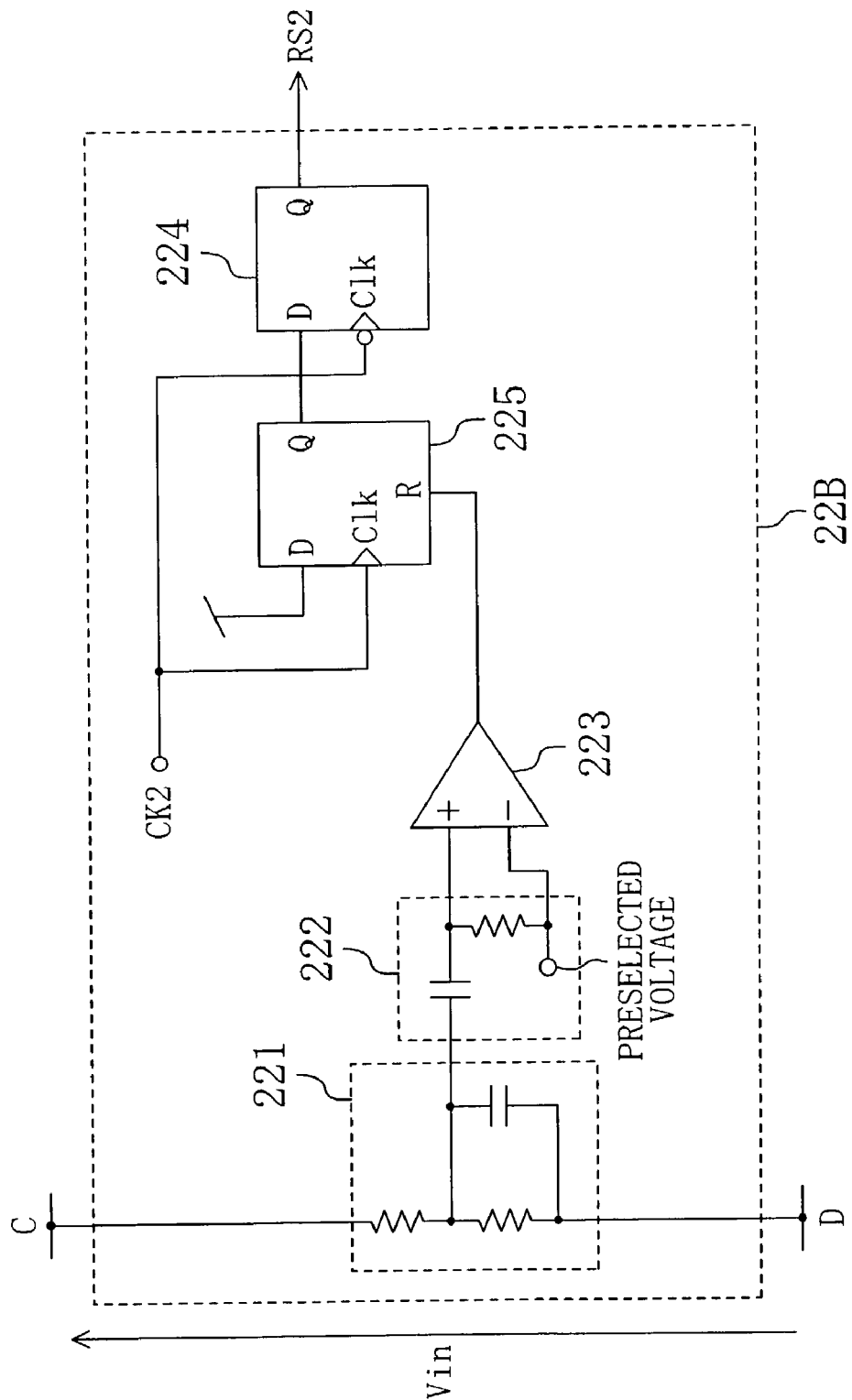
FIG. 19 is a diagram for showing the configuration of a first signal detection circuit used in a data communication system according to Embodiment 7 of the invention.

FIG. 19 shows the configuration of the first signal detection circuit 22B. The first signal detection circuit 22B includes a low-pass filter 221, a high-pass filter 222, a comparator 223, a D-type flip-flop 224 and a D-type flip-flop 225 with asynchronous reset.

Data transfer from the controller device 1E to the data carrier device 2E of the data communication system of this embodiment will now be described in detail with reference to the timing charts of FIGS. 20A through 20K.

The first transmitter circuit 143 receives the first transmitting signal TS1 in synchronization with the operation clock CK1 (as shown in FIGS. 20A and 20B). The edge generation timing adjusting mechanism 143b of the first transmitter circuit 143 shifts the edge of the first transmitting signal TS1 from the edge of the operation clock CK1, so as to apply the gate voltage of the MOS transistor 143a. At this point, the edge generation timing is shifted so that both the rise and glitch edges can be generated within one cycle of the operation clock CK1 and when the potential level of the operation clock CK1 is stable. As a result, the first operation voltage Vout is shifted in the edge generation timing from the operation clock CK1 (as shown in FIG. 20C). Furthermore, as compared with the timing chart of FIG. 18C, there arises a larger difference between the pulse widths of the first operation voltage Vout respectively corresponding to the logical "H" and "L" levels of the first transmitting signal TS1. In FIG. 20C, the pulse width corresponding to the logical "L" level is shorter than that corresponding to the logical "H" level. The extent of the shift of the edge generation timing of the first transmitting signal TS1 is larger than the duration of the skew A.

The amplitude of the signals CK and ICK generated by the clock generation circuit 12 is small when the first operation voltage Vout is low and is large when the voltage Vout is high (as shown in FIGS. 20D and 20E). Since the edge generation timing of the first operation voltage Vout is shifted from the duration of the skew A, the voltage change corresponding to the edge of the first operation voltage Vout appears in a portion of either the signal CK or the signal ICK where its voltage level is stable. In FIG. 20D, the voltage change corresponding to the edge of the first operation voltage Vout appears in the signal ICK. The data carrier device 2E obtains the second operation voltage Vin by rectifying the thus generated signals CK and ICK by the rectifier circuit 21. There is no rounding in the change of the thus generated second operation voltage Vin (as shown in FIG. 20F).

Next, the extraction of data superimposed on the second operation voltage Vin by the first signal detection circuit 22B will be described.

First, the second operation voltage Vin is input to the low-pass filter 221, so as to remove noise (such as a voltage glitch derived from the skew A). Then, the signal having passed through the low-pass filter 221 is input to the high-pass filter 222, so as to remove a DC component and detect the edge. Thereafter, the signal having passed through the high-pass filter 222 is input to the comparator 223 with hysteresis. FIG. 20G shows the signal having passed through the high-pass filter 222 and the preselected voltage and the hysteresis levels of the comparator 223. A signal exceeding the predetermined high (or low) hysteresis level is extracted as a signal at a logical "H" (or "L") level (as shown in FIG.

20H). The output of the comparator 223 is input to the D-type flip-flop 225 with the asynchronous reset.

The D-type flip-flop 225 with the asynchronous reset is always supplied with a signal at a logical "H" level, and the output of the comparator 223 is input to the D-type flip-flop 225 as a reset signal. Therefore, in the case where the output of the comparator 223 is at a logical "L" level, the D-type flip-flop 225 with the asynchronous reset keeps the logical "L" level, and in the case where the output of the comparator 223 is at a logical "H" level, the output of the D-type flip-flop 225 with the asynchronous reset undergoes a low to high transition in synchronization with the rise of the operation clock CK2 generated by the clock detection circuit 24 (as shown in FIGS. 20I and 20J). Ultimately, the output of the D-type flip-flop 225 with the asynchronous reset is input to the D-type flip-flop 224, so as to be output as the first receiving signal RS2 in synchronization with the glitch of the operation clock CK2 (as shown in FIG. 20K).

In this manner, since no rounding is caused in the change of the second operation voltage Vin in this embodiment, data superimposed on the second operation voltage Vin can be accurately extracted. Also, the data extraction can be eased by detecting the edge of the second operation voltage Vin. Furthermore, since the pulse width of the first operation voltage Vout corresponding to the logical "L" level of the first transmitting signal TS1 is further shorter than in Embodiment 6, the consumed power in the entire system can be further reduced.

In the case where the voltage level generation circuit 131 and the first transmitter circuit 143 have structures in which larger power is consumed when the logical level of the first transmitting signal TS1 is "H" than when it is "L", the pulse width of the first operation voltage Vout corresponding to the "H" level is made shorter than that corresponding to the "L" level contrary to the above description. Thus, the consumed power of the entire system can be reduced.

Although the first operation voltage Vout is low (or high) when the logical level of the first transmitting signal TS1 is "L" (or "H") in Embodiments 6 and 7, the potential level of the first operation voltage Vout may be reversed. Also, although the first transmitter circuit 143 includes the edge generation timing adjusting mechanism 143*b* for adjusting the edge generation timing of the first transmitting signal TS1 in these embodiments, this mechanism may be included in another constituting element. For example, the voltage level generation circuit 131 may include the edge generation timing adjusting mechanism 143*b*, so as to generate the first operation voltage Vout shifted from the skew between the signals CK and ICK. On the contrary, the operation clock CK1 used for generating the signals CK and ICK may be shifted instead, or the first transmitter circuit 143 may receive the first transmitting signal TS1 in which the edge generation timing is shifted beforehand. Further preferably, the duration of the skew between the signals CK and ICK does not overlap the generation timing of the glitch edge of the first operation voltage Vout for the following reason: If the glitch of the second operation voltage Vin derived from the skew overlaps the glitch of the first operation voltage Vout, the second operation voltage Vin may become lower than the minimum operation voltage of the data carrier device 2E.

As described so far, according to the data communication system of the present invention, the supply of the power and the clock from the controller device to the data carrier device and the two-way data communication between the controller device and the data carrier device can be both executed through the two contacts. Accordingly, the data communication system of this invention can be more suitable to downsizing than conventional ones.

Furthermore, in the data communication system, data transferred from the controller device to the data carrier device can be accurately and easily extracted. Also, power consumed in the data communication system can be reduced.

What is claimed is:

1. A data communication system comprising:
   a controller device; and
   a data carrier device connectable to said controller device through first and second contacts for performing data transfer between said controller device and said data carrier device,
   wherein said controller device includes:
      a power supply line for supplying power:
      a clock generation circuit for generating a clock pulse signal and supplying said clock pulse signal to at least one of said first and second contacts;
      a voltage level generation circuit for converting a voltage from said power supply line and supplying said converted voltage to said clock generation circuit as a first operation voltage; and
      a first transmitter circuit for changing said first operation voltage generated by said voltage level generation circuit in accordance with a first transmitting signal, and
   said data carrier device includes:
      a rectifier circuit for rectifying a voltage between said first and second contacts and supplying said rectified voltage to said data carrier device as a second operation voltage;
      a first signal detection circuit for detecting, as a first receiving signal, change of said second operation voltage having been rectified by said rectifier circuit; and
      a clock detection circuit for generating an operation clock on the basis of said clock pulse signal supplied to at least one of said first and second contacts.

2. The data communication system of claim 1,
   wherein said voltage level generation circuit includes a plurality of resistors serially disposed between said power supply line and ground, and supplies said first operation voltage from an end of one of said plurality of resistors, and
   said first transmitter circuit includes a switching element that is connected in parallel to at least one of said plurality of resistors and is turned on/off in accordance with said first transmitting signal.

3. The data communication system of claim 1,
   wherein said voltage level generation circuit includes a plurality of resistors serially disposed between said power supply line and ground, and supplies said first operation voltage from an end of one of said plurality of resistors, and
   said first transmitter circuit includes a switching element that is connected in series to at least one of said plurality of resistors and is turned on/off in accordance with said first transmitting signal.

4. The data communication system of claim 1,
   wherein said controller device further includes a second signal detection circuit for detecting, as a second receiving signal, change of voltage amplitude on a terminal for outputting said first operation voltage of said voltage level generation circuit, and said data carrier device further includes a second transmitter circuit for changing impedance between said first and second contacts in accordance with a second transmitting signal.

5. The data communication system of claim 1,
wherein said controller device supplies, to said first contact, said clock pulse signal generated by said clock generation circuit and supplies, to said second contact, an inverted clock pulse signal in a phase reverse to that of said clock pulse signal generated by said clock generation circuit, and
said rectifier circuit performs full-wave rectification on said voltage between said first and second contacts.

6. The data communication system of claim 1,
wherein said controller device supplies said clock pulse signal generated by said clock generation circuit to said first contact and supplies ground potential to said second contact, and
said rectifier circuit performs half-wave rectification on said voltage between said first and second contacts.

7. The data communication system of claim 1,
wherein said voltage level generation circuit and said clock generation circuit are serially connected to each other in said controller device.

8. The data communication system of claim 1,
wherein said clock generation circuit generates said clock pulse signal and an inverted clock pulse signal in a phase reverse to that of said clock pulse signal and supplies said clock pulse signal and said inverted clock pulse signal to said first and second contacts, respectively, and
said first transmitter circuit changes said first operation voltage in accordance with said first transmitting signal in such a manner that a rise edge of said first operation voltage supplied to said clock generation circuit is generated in a stable period shifted from edges of said clock pulse signal and said inverted clock pulse signal.

9. The data communication system of claim 8,
wherein said first transmitter circuit changes said first operation voltage in accordance with said first transmitting signal in such a manner that voltage changes corresponding to a rise edge and a glitch edge of said first operation voltage appear in one of said clock pulse signal and said inverted clock pulse signal.

10. The data communication system of claim 8,
wherein said first transmitter circuit changes said first operation voltage in accordance with said first transmitting signal in such a manner that a voltage change corresponding to a rise edge of said first operation voltage appears in one of said clock pulse signal and said inverted clock pulse signal and that a voltage change corresponding to a glitch edge of said first operation voltage appears in the other of said clock pulse signal and said inverted clock pulse signal.

11. The data communication system of claim 8,
wherein said first transmitter circuit changes said first operation voltage in accordance with said first transmitting signal with causing a difference between a period when said first operation voltage has potential corresponding to a logical "H" level and a period when said first operation voltage has potential corresponding to a logical "L" level.

12. The data communication system of claim 1,
wherein said first signal detection circuit includes a high-pass filter for receiving a voltage in which a change is to be detected and detecting an edge of said voltage.

13. The data communication system of claim 12,
wherein said first signal detection circuit includes:
a low-pass filter for removing noise from said voltage;
a comparator for comparing a level of a signal having passed through said high-pass filter with a given level; and
a flip-flop for receiving a comparison result of said comparator and detecting, as said first receiving signal, a signal in synchronization with said operation clock generated by said clock detection circuit, and
said high-pass filter receives a signal having passed through said low-pass filter.

14. A data communication system comprising:
a controller device; and
a data carrier device connectable to said controller device through first and second contacts for performing data transfer between said controller device and said data carrier device,
wherein said controller device includes:
a power supply line for supplying power;
a voltage level generation circuit for converting a voltage from said power supply line and supplying said converted voltage as a signal voltage between said first and second contacts; and
a first transmitter circuit for changing said signal voltage generated by said voltage level generation circuit in accordance with a first transmitting signal, and
said data carrier device includes:
a regulator for stabilizing a voltage between said first and second contacts and supplying said stabilized voltage as an operation voltage of said data carrier device; and
a first signal detection circuit for detecting, as a first receiving signal, change of said voltage between said first and second contacts.

15. The data communication system of claim 14,
wherein said controller device further includes a second signal detection circuit for detecting, as a second receiving signal, change of said voltage between said first and second contacts, and
said data carrier device further includes a second transmitter circuit for changing impedance between said first and second contacts in accordance with a second transmitting signal.

16. The data communication system of claim 14,
wherein said voltage level generation circuit includes a plurality of resistors serially disposed between said power supply line and ground, and supplies said signal voltage from an end of one of said plurality of resistors, and
said first transmitter circuit includes a switching element that is connected in parallel to at least one of said plurality of resistors and is turned on/off in accordance with said first transmitting signal.

17. The data communication system of claim 14,
wherein said first signal detection circuit includes a high-pass filter for receiving a voltage in which a change is to be detected and detecting an edge of said voltage.

18. The data communication system of claim 17,
wherein said first signal detection circuit includes:
a low-pass filter for removing noise from said voltage;
a comparator for comparing a level of a signal having passed through said high-pass filter with a given level; and
a flip-flop for receiving a comparison result of said comparator and detecting, as said first receiving signal, a signal in synchronization with said operation clock generated by said clock detection circuit, and said high-pass filter receives a signal having passed through said low-pass filter.

19. A data communication system comprising:

a controller device; and a data carrier device connectable to said controller device through first and second contacts for performing data transfer between said controller device and said data carrier device, wherein said controller device includes:

a power supply line for supplying power;

a clock generation circuit for generating a clock pulse signal and supplying said clock pulse signal to at least one of said first and second contacts;

a voltage level generation circuit for converting a voltage from said power supply line and supplying, as a first operation voltage, said converted voltage to said clock generation circuit; and a pulse width modulation circuit for changing, in accordance with a first transmitting signal, a pulse width of said clock pulse signal generated by said clock generation circuit, and said data carrier device includes:

a rectifier circuit for rectifying a voltage between said first and second contacts and supplying said rectified voltage to said data carrier device as a second operation voltage;

a first signal detection circuit for detecting, as a first receiving signal, change of said pulse width of said clock pulse signal on either of the first and second contacts; and a clock detection circuit for generating an operation clock on the basis of said clock pulse signal supplied to at least one of said first and second contacts.

20. The data communication system of claim 19, wherein said controller device further includes a second signal detection circuit for detecting, as a second receiving signal, change of voltage amplitude on one of said first and second contacts, and said data carrier device further includes a second transmitter circuit for changing impedance between said first and second contacts in accordance with a second transmitting signal.

21. The data communication system of claim 19, wherein said controller device further includes a second signal detection circuit for detecting, as a second receiving signal, change of voltage amplitude on a terminal for outputting said first operation voltage of said voltage level generation circuit, and said data carrier device further includes a second transmitter circuit for changing impedance between said first and second contacts in accordance with a second transmitting signal.

22. The data communication system of claim 19, wherein said controller device supplies, to said first contact, said clock pulse signal generated by said clock generation circuit and supplies, to said second contact, an inverted clock pulse signal in a phase reverse to that of said clock pulse signal generated by said clock generation circuit, and said rectifier circuit performs full-wave rectification on said voltage between said first and second contacts.

23. The data communication system of claim 19, wherein said controller device supplies said clock pulse signal generated by said clock generation circuit to said first contact and supplies ground potential to said second contact, and said rectifier circuit performs half-wave rectification on said voltage between said first and second contacts.

24. A data communication system comprising:

a controller device; and a data carrier device connectable to said controller device through first and second contacts for performing data transfer between said controller device and said data carrier device, wherein said controller device includes:

a power supply line for supplying power;

a clock generation circuit for receiving a first operation voltage from said power supply line, generating a clock pulse signal and supplying said clock pulse signal to at least one of said first and second contacts; and a first transmitter circuit for changing, in accordance with a first transmitting signal, one of a higher voltage level and a lower voltage level of said clock pulse signal generated by said clock generation circuit, and said data carrier device includes:

a rectifier circuit for rectifying a voltage between said first and second contacts and supplying said rectified voltage to said data carrier device as a second operation voltage;

a first signal detection circuit for detecting, as a first receiving signal, change of said second operation voltage having been rectified by said rectifier circuit; and a clock detection circuit for generating an operation clock on the basis of said clock pulse signal supplied to at least one of said first and second contacts.

25. The data communication system of claim 1, wherein said controller device further includes a second signal detection circuit for detecting, as a second receiving signal, change of voltage amplitude on one of said first and second contacts, and said data carrier device further includes a second transmitter circuit for changing impedance between said first and second contacts in accordance with a second transmitting signal.

26. The data communication system of claim 24, wherein said controller device further includes a second signal detection circuit for detecting, as a second receiving signal, change of voltage amplitude on one of said first and second contacts, and said data carrier device further includes a second transmitter circuit for changing impedance between said first and second contacts in accordance with a second transmitting signal.

27. The data communication system of claim 24, wherein said controller device supplies, to said first contact, said clock pulse signal generated by said clock generation circuit and supplies, to said second contact, an inverted clock pulse signal in a phase reverse to that of said clock pulse signal generated by said clock generation circuit, and said rectifier circuit performs full-wave rectification on said voltage between said first and second contacts.

28. The data communication system of claim 24,
wherein said controller device supplies said clock pulse signal generated by said clock generation circuit to said first contact and supplies ground potential to said second contact, and said rectifier circuit performs half-wave rectification on said voltage between said first and second contacts.

29. The data communication system of any of claim 24,
wherein said first signal detection circuit includes a high-pass filter for receiving a voltage in which a change is to be detected and detecting an edge of said voltage.

30. The data communication system of claim 29,
wherein said first signal detection circuit includes:
- a low-pass filter for removing noise from said voltage;
- a comparator for comparing a level of a signal having passed through said high-pass filter with a given level; and
- a flip-flop for receiving a comparison result of said comparator and detecting, as said first receiving signal, a signal in synchronization with said operation clock generated by said clock detection circuit, and said high-pass filter receives a signal having passed through said low-pass filter.

31. A controller device for performing data transfer to and from a data carrier device through first and second contacts, comprising:
- a power supply line for supplying power;
- a clock generation circuit for generating a clock pulse signal and an inverted clock pulse signal in a phase reverse to that of said clock pulse signal, and supplying said clock pulse signal and said inverted clock pulse signal to said first and second contacts, respectively;
- a voltage level generation circuit for converting a voltage from said power supply line and supplying, as an operation voltage, said converted voltage to said clock generation circuit; and
- a transmitter circuit for changing said operation voltage generated by said voltage level generation circuit in accordance with a transmitting signal, wherein said operation voltage is generated in such a manner that a rise edge of said operation voltage is generated in a stable period shifted from edges of said clock pulse signal and said inverted clock pulse signal.

32. A data communication method for performing data transfer between a controller device and a data carrier device through first and second contacts, comprising the steps of:
- generating a clock pulse signal in said controller device;
- changing a voltage level of said clock pulse signal in accordance with a first transmitting signal and supplying said clock pulse signal to at least one of said first and second contacts in said controller device;
- rectifying a voltage between said first and second contacts and supplying said rectified voltage to said data carrier device as a second operation voltage in said data carrier device;
- detecting change of said second operation voltage as a first receiving signal in said data carrier device;
- generating an operation clock on the basis of said clock pulse signal supplied to at least one of said first and second contacts in said data carrier device;
- detecting, as a second receiving signal, change of voltage amplitude on one of said first and second contacts in said controller device; and
- changing impedance between said first and second contacts in accordance with a second transmitting signal in said data carrier device.

33. A data communication method for performing data transfer between a controller device and a data carrier device through first and second contacts, comprising the steps of:
- generating a first operation voltage by changing a voltage from a power supply line in accordance with a transmitting signal in said controller device;
- generating a clock pulse signal and an inverted clock pulse signal in a phase reverse to that of said clock pulse signal by using said first operation voltage as an operation voltage in said controller device;
- supplying said clock pulse signal and said inverted clock pulse signal to said first and second contacts, respectively in said controller device;
- generating a second operation voltage as an operation voltage of said data carrier device by rectifying a voltage between said first and second contacts in said data carrier device; and
- detecting change of said second operation voltage as a receiving signal in said data carrier device, wherein said first operation voltage is generated in such a manner that a rise edge of said first operation voltage is generated in a stable period shifted from edges of said clock pulse signal and said inverted clock pulse signal.

34. The data communication method of claim 33,
wherein said first operation voltage is generated by changing said first operation voltage in accordance with said transmitting signal in such a manner that a voltage change corresponding to a rise edge of said first operation voltage appears in one of said clock pulse signal and said inverted clock pulse signal and that a voltage change corresponding to a glitch edge of said first operation voltage appears in the other of said clock pulse signal and said inverted clock pulse signal.

* * * * *